(12) United States Patent
Espinosa

(10) Patent No.: US 8,136,318 B2
(45) Date of Patent: Mar. 20, 2012

(54) HOLD DOWN SYSTEM

(76) Inventor: Thomas M Espinosa, Snohomish, WA (US)

( * ) Notice: Subject to any disclaimer, the term of this patent is extended or adjusted under 35 U.S.C. 154(b) by 0 days.

(21) Appl. No.: 12/805,245

(22) Filed: Jul. 20, 2010

(65) Prior Publication Data

US 2011/0113711 A1  May 19, 2011

Related U.S. Application Data

(63) Continuation of application No. 11/898,479, filed on Sep. 12, 2007, now Pat. No. 7,762,030.

(51) Int. Cl.
*E02D 27/00* (2006.01)
(52) U.S. Cl. ............. 52/293.3; 52/223.13; 52/223.14; 52/705; 52/709; 52/167.1; 52/295; 52/92.2; 52/93.1; 52/698; 52/23; 411/536; 411/432; 411/433
(58) Field of Classification Search ........... 52/223.13, 52/223.14, 705, 709, 167.1, 295, 293.3, 92.2, 52/93.1, 698, 23; 411/536, 432, 433
See application file for complete search history.

(56) References Cited

U.S. PATENT DOCUMENTS

| | | | | |
|---|---|---|---|---|
| 2,171,985 A * | 9/1939 | Mushet | | 411/31 |
| 3,890,758 A * | 6/1975 | Bouchard | | 52/713 |
| 4,027,711 A * | 6/1977 | Tummarello | | 411/172 |
| 5,347,777 A * | 9/1994 | Sudduth | | 52/223.13 |
| 5,364,214 A * | 11/1994 | Fazekas | | 411/536 |
| 5,522,688 A * | 6/1996 | Reh | | 411/536 |
| 5,570,549 A * | 11/1996 | Lung et al. | | 52/295 |
| 5,606,829 A * | 3/1997 | Hararat-Tehrani | | 52/1 |
| 5,706,626 A * | 1/1998 | Mueller | | 52/800.12 |
| 5,718,090 A * | 2/1998 | Wei-Hwang | | 52/223.14 |
| 5,815,999 A * | 10/1998 | Williams | | 52/223.13 |
| 5,904,025 A * | 5/1999 | Bass et al. | | 52/741.3 |
| 6,148,583 A * | 11/2000 | Hardy | | 52/693 |
| 6,161,350 A * | 12/2000 | Espinosa | | 52/293.3 |
| 6,195,949 B1 * | 3/2001 | Schuyler | | 52/223.13 |
| 6,494,654 B2 * | 12/2002 | Espinosa | | 411/353 |
| 6,560,940 B2 * | 5/2003 | Mueller | | 52/295 |
| 6,688,058 B2 * | 2/2004 | Espinosa | | 52/293.3 |
| 6,951,078 B2 * | 10/2005 | Espinosa | | 52/23 |
| 7,159,366 B2 * | 1/2007 | Espinosa | | 52/293.3 |
| 7,174,679 B1 * | 2/2007 | Mueller | | 52/167.1 |
| 7,251,920 B2 * | 8/2007 | Timmerman et al. | | 52/800.13 |
| 7,296,501 B2 * | 11/2007 | Leek et al. | | 81/176.1 |
| 7,506,479 B2 * | 3/2009 | Pryor | | 52/293.3 |
| 7,762,030 B2 * | 7/2010 | Espinosa | | 52/293.3 |
| 2002/0004431 A1 * | 1/2002 | Nye | | 473/483 |
| 2004/0057809 A1 * | 3/2004 | Nakagami | | 411/368 |
| 2005/0055897 A1 * | 3/2005 | Commins | | 52/169.1 |
| 2005/0100428 A1 * | 5/2005 | Commins | | 411/536 |
| 2006/0133912 A1 * | 6/2006 | Commins | | 411/536 |
| 2006/0156657 A1 * | 7/2006 | Commins | | 52/223.13 |

* cited by examiner

*Primary Examiner* — Mark Wendell
(74) *Attorney, Agent, or Firm* — Shlesinger, Arkwright & Garvey LLP

(57) ABSTRACT

A fastener assembly comprises a first cylindrical member disposed within a second cylindrical member. One of the first and second cylindrical members is movable relative to the other in a first direction. The other one of the first and second cylindrical members is locked relative to the one in a second direction opposite to the first direction. A spring is operably attached to the first and second cylindrical members to urge one of the first and second cylindrical members in the first direction. A removable member is operably associated with the first and second cylindrical members to prevent one of the first and second cylindrical members from moving in the first direction prior to removing the removable member. The removable member is configured to be pulled out to allow one of the first and second cylindrical members to move in the first direction.

40 Claims, 24 Drawing Sheets

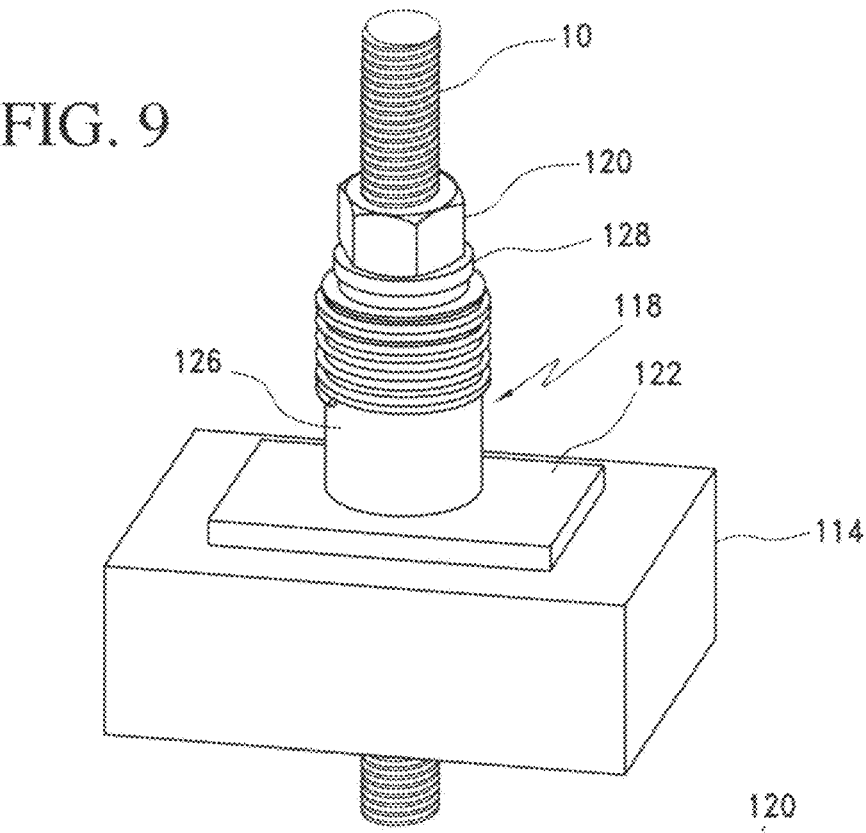
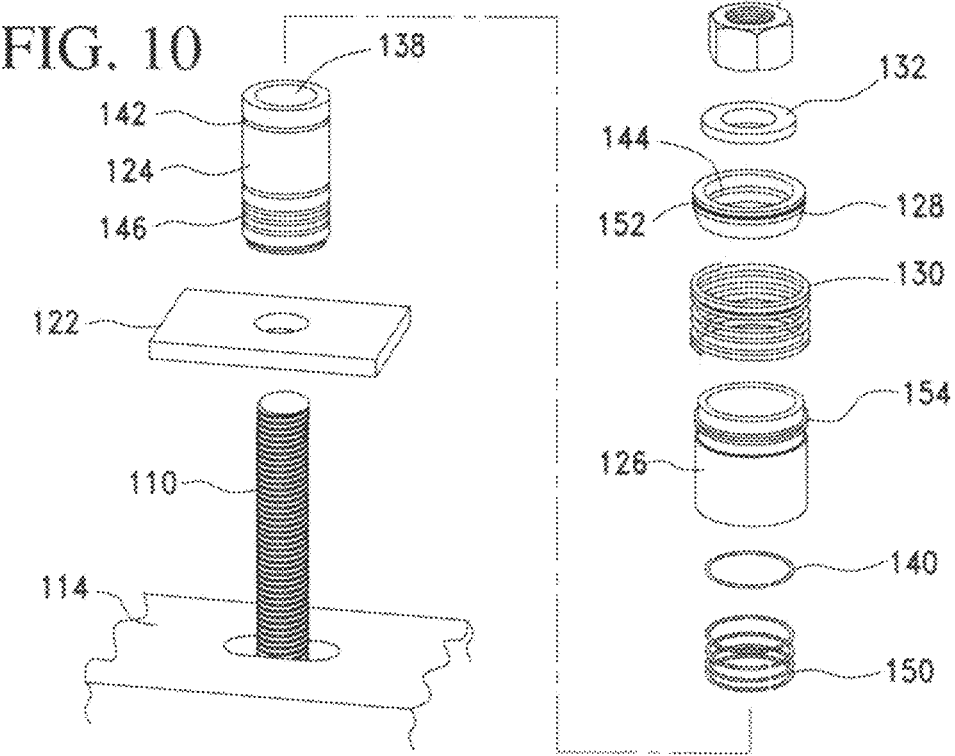

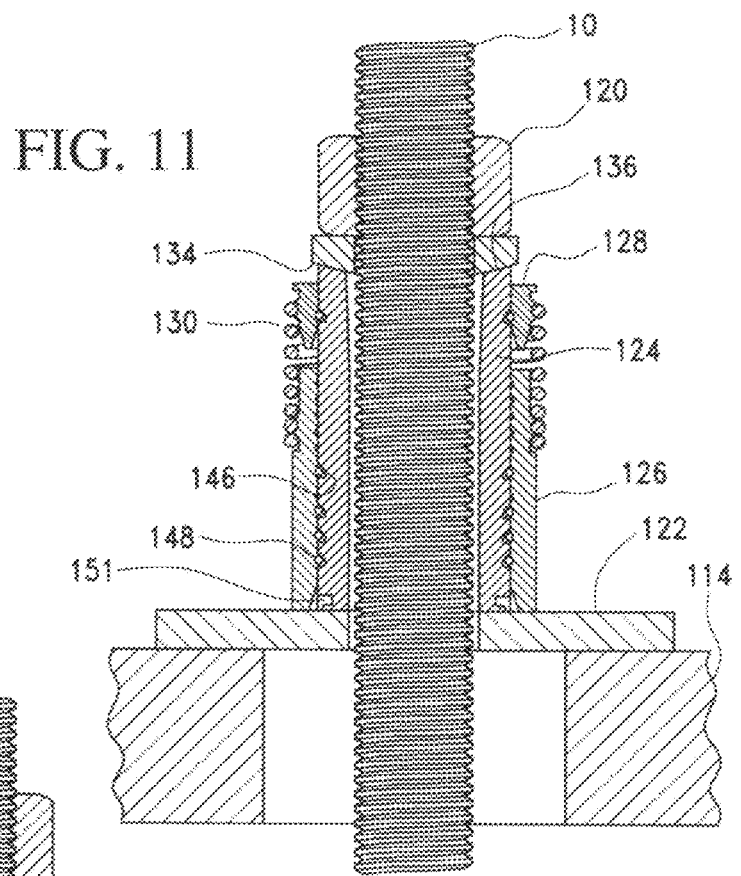
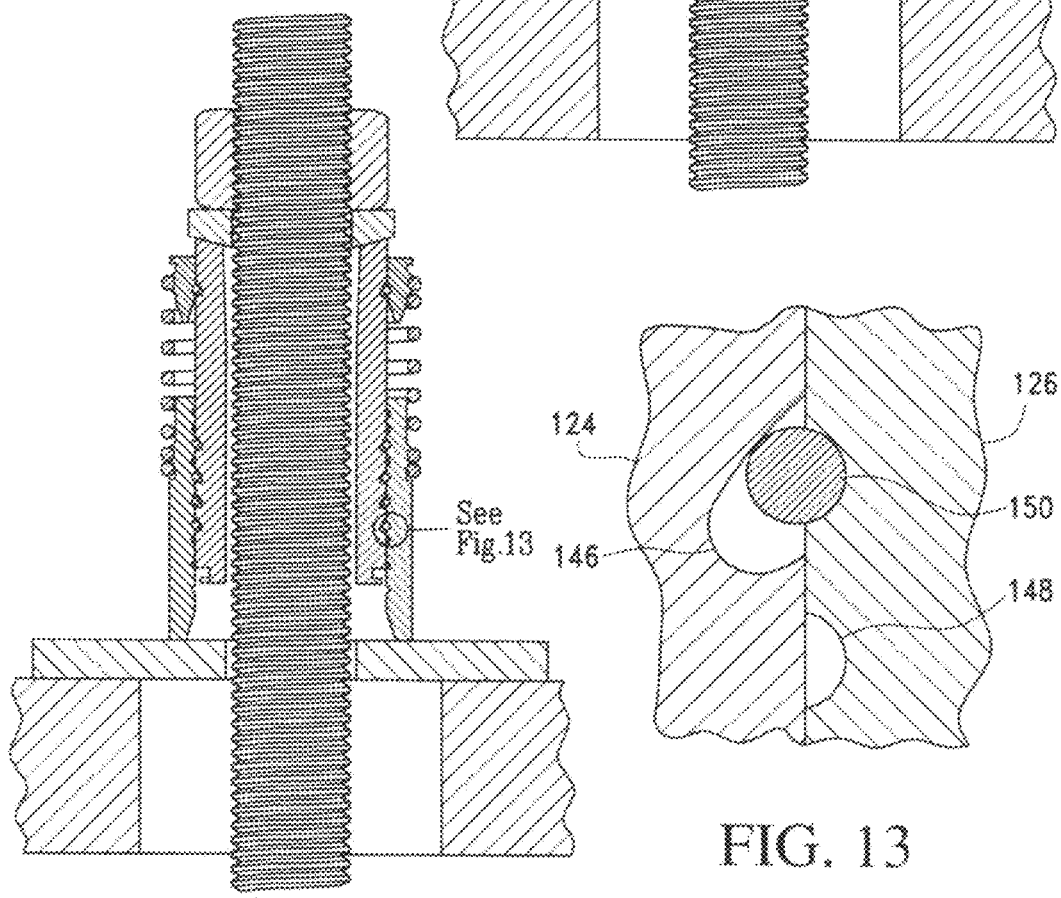
FIG. 11
FIG. 12
FIG. 13

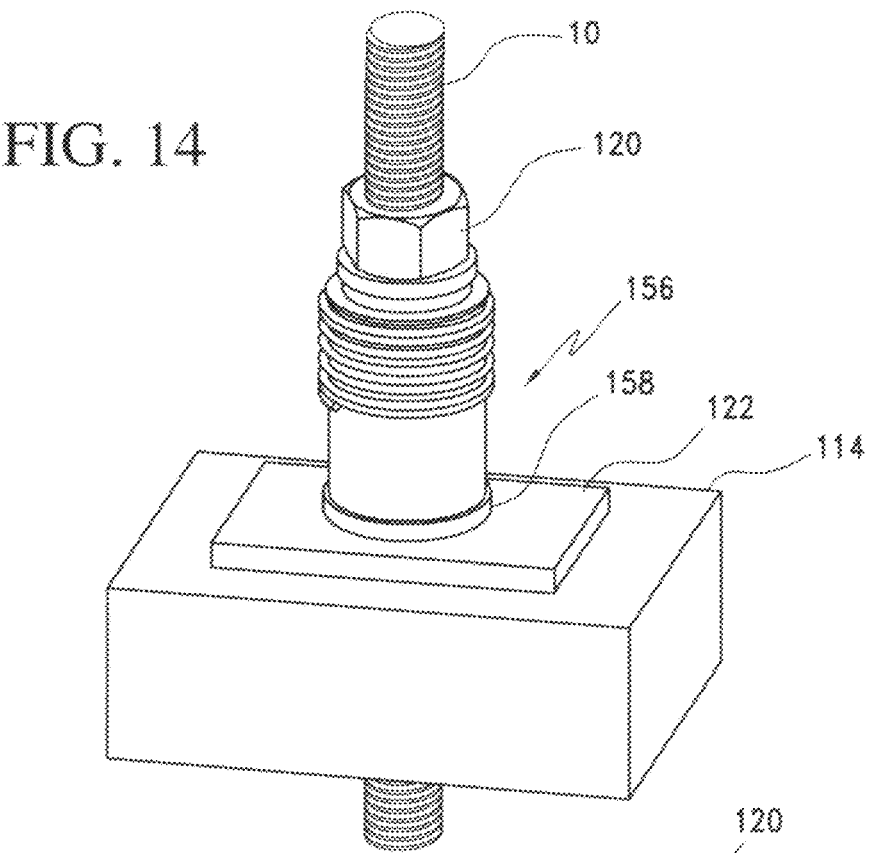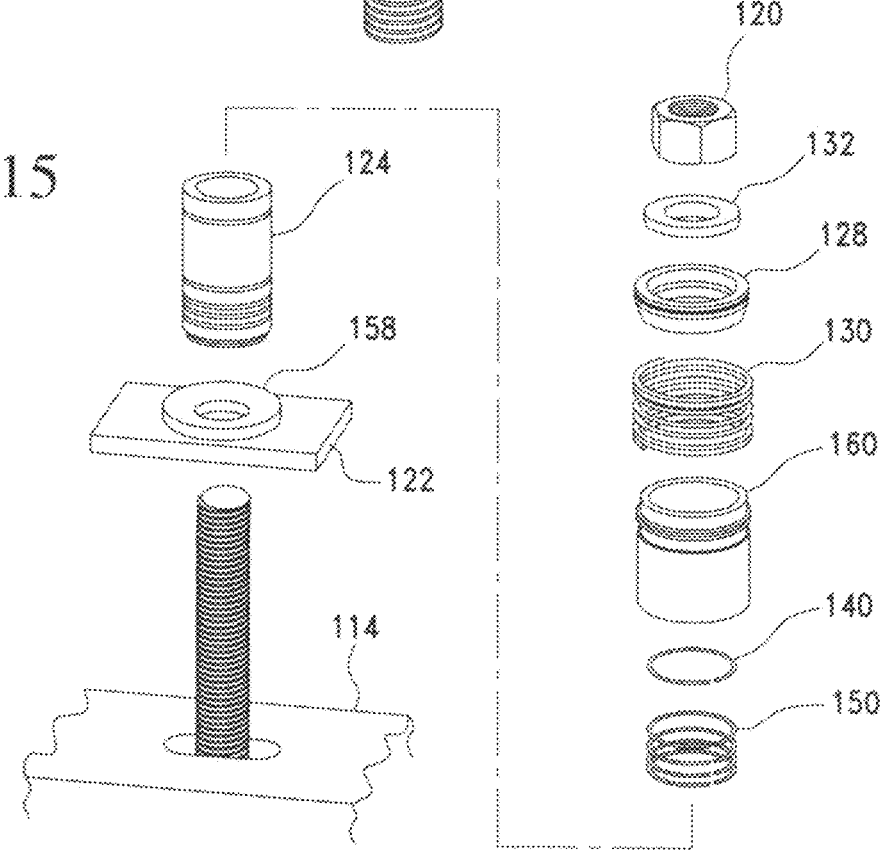

HOLD DOWN SYSTEM

RELATED APPLICATION

This is a continuation of application Ser. No. 11/898,479, filed Sep. 12, 2007, now U.S. Pat. No. 7,762,030, which claims the priority benefit of provisional application Ser. No. 60/843,698, filed Sep. 12, 2006, which is hereby incorporated by reference.

FIELD OF THE INVENTION

The present invention is generally directed to a tension hold down system used in walls in light frame construction to resist uplift and to compensate for wood shrinkage in wood frame construction and compression loading.

BACKGROUND OF THE INVENTION

Prior art hold down systems, such as one disclosed in U.S. Pat. No. 6,951,078, typically use a tie-rod that extends inside a stud wall from the foundation to the top floor. Field conditions and the quality of the installer are such that the tie-rod may not be installed perpendicular to the cross or bridge member to which the tie-rod is to be secured. In such a situation, the bearing surface of the bridge member and the hold down device may not align properly for good bearing contact due to the out-of vertical position of the tie-rod. The resulting installation may not be satisfactory since full contact between bearing surfaces of the various components of the system is not achieved, thereby compromising the integrity of the system.

Another problem encountered with prior art hold down devices is that sometimes the installer forgets to activate the device after installation. The problem is sometimes discovered after the wall has been closed, thus causing a lot of expense to correct the problem.

Yet another problem with prior art device is the need of using a tool to load the spring in a hold down device. When a hold down device comes preloaded from the factory, and an installer accidentally releases the lock and allows the compressed spring inside to expand, to reset the spring would typically require a tool which may not be available to the installer.

OBJECTS OF THE INVENTION

It is an object of the present invention to provide a hold down system and components therefor that would compensate for the non-perpendicularity of the tie-rod to the bearing surfaces of the wall to which the tie-rod is attached.

It is another object of the present invention to provide a hold down system and components therefor that would minimize the problem of forgetting to activate the hold down device after installation.

It yet another object of the present invention to provide a hold down system and components therefor that does not require the use of a tool to activate the hold down device.

It is still another object of the present invention to provide a hold down system and components where the hold down device can be reassembled and pre-loaded in the field by hand without using tools.

It is an object of the present invention to provide a hold down system and components therefor that is color coded to assist in the installation of the components that have been properly specified for the project.

In summary, a fastener assembly comprises a first cylindrical member disposed within a second cylindrical member, the first cylindrical member having an axial opening. One of the first and second cylindrical members is movable relative to another one of the first and second cylindrical members in a first direction, and the one of the first and second cylindrical members is locked relative to the another one of the first and second cylindrical members in a second direction opposite to the first direction. The first and second cylindrical members include first and second opposing cylindrical walls, respectively, the first opposing cylindrical wall including a plurality of first receiving volumes, and the second opposing cylindrical wall including a plurality of second receiving volumes. A spring is operably attached to the first and second cylindrical members to urge the one of the first and second cylindrical members in the first direction. A removable member is operably associated with the first and second cylindrical members to prevent the one of the first and second cylindrical members from moving in the first direction prior to removing the removable member, the removable member being configured to be pulled out to allow the one of the first and second cylindrical members to move in the first direction.

A fastener system for securing a building wall to a foundation comprises a tie-rod having one end for being secured to a building foundation and a building wall; a bearing plate for attachment to the wall, the bearing plate having an opening for allowing the tie rod to extend therethrough; a first washer around the tie rod, the first washer having a first curved upper surface, the first washer for bearing on the bearing plate; a second washer around the tie rod, the second washer having a second curved bottom surface complementary to the first curved upper surface, the second curved bottom surface bearing on the first curved upper surface; and a nut for being secured against the second washer, the nut for tensioning the tie rod; whereby the first curved upper surface remains in substantial contact with the second curved bottom surface even when the tie rod is off vertical.

A fastener assembly comprises a first cylindrical member disposed within a second cylindrical member, the first cylindrical member having an axial opening. The second cylindrical member is movable relative to the first cylindrical member in a first direction, and the second cylindrical member is locked relative to the first cylindrical member in a second direction opposite to the first direction. A sleeve is attached to an upper end portion of the first cylindrical member; and a spring is operably attached to the second cylindrical member and the sleeve to urge the second cylindrical member in the first direction.

A fastener assembly comprises a first cylindrical member disposed within a second cylindrical member, the first cylindrical member having an axial opening for a tie rod. One of the first and second cylindrical members is movable relative to another one of the first and second cylindrical members in a first direction, and the one of the first and second cylindrical members is locked relative to the another one of the first and second cylindrical members in a second direction opposite to the first direction. A sleeve is disposed around the first cylindrical member, the sleeve being locked relative to the first cylindrical member in the first direction; and a spring is operably attached to the second cylindrical member and the sleeve to urge the one of the first and second cylindrical members in the first direction.

These and other objects of the present invention will become apparent from the following detailed description.

BRIEF DESCRIPTIONS OF THE DRAWINGS

FIG. 9 is a perspective view of an embodiment of a hold down device attached to a threaded rod.

FIG. 10 is an assembly view of FIG. 9.

FIG. 11 is a cross-sectional view of FIG. 9, showing the hold down device in a retracted position prior to extending to take up the shrinkage in the stud wall.

FIG. 12 is a cross-sectional view, showing the hold down device in a partly extended position after taking up the shrinkage in the stud wall.

FIG. 13 is an enlarged cross-sectional view taken from FIG. 12 of the cooperating grooves in the inner cylinder and outer sleeve or cylindrical member of the hold down device.

FIG. 14 is a perspective view of another embodiment of a hold down system made in accordance with the present invention.

FIG. 15 is an assembly view of FIG. 14.

DETAILED DESCRIPTION OF THE INVENTION

Figure 1:
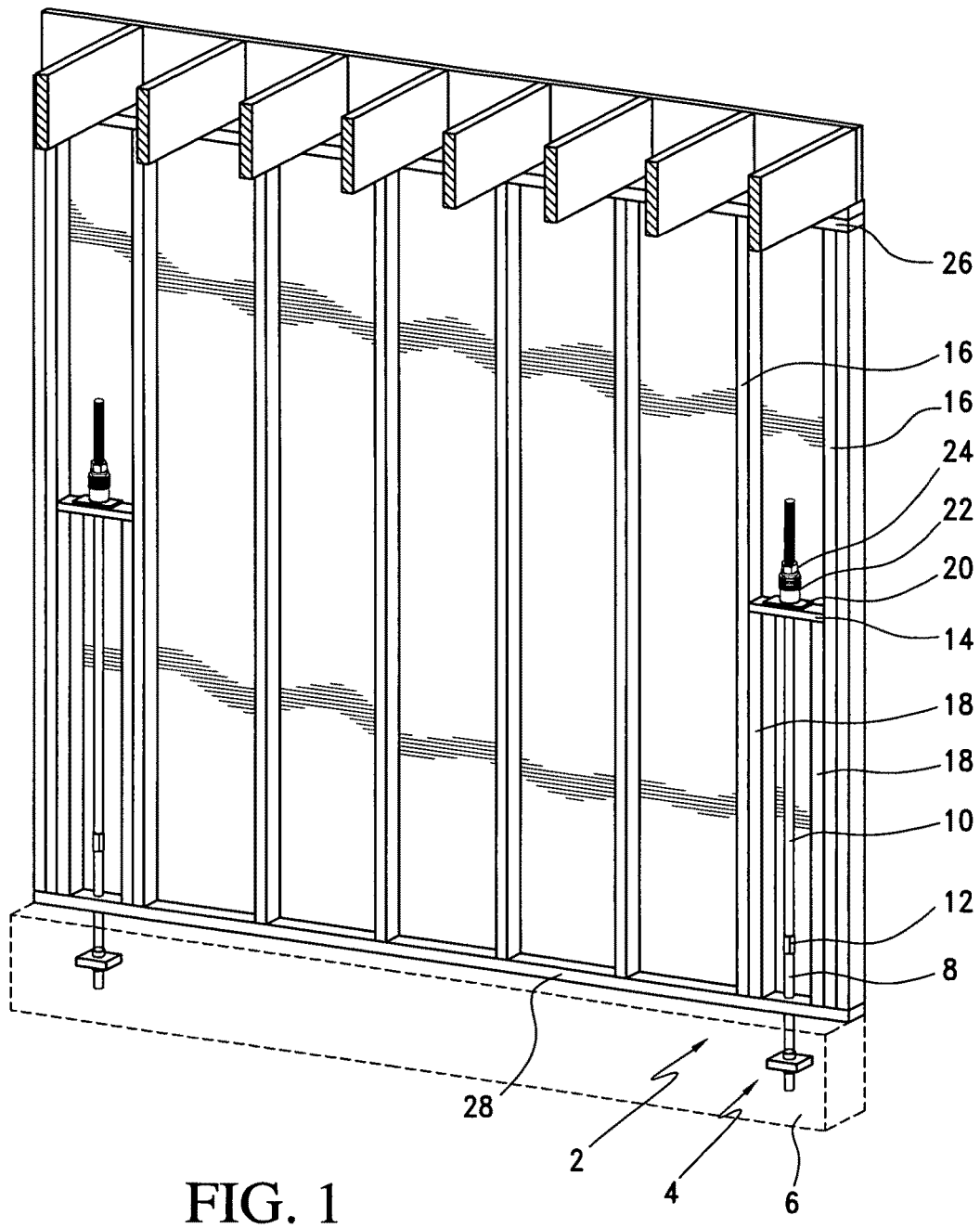
FIG. 1 is a perspective view of stud wall of a one story building incorporating a hold down system made in accordance with the present invention.

Referring to FIG. 1, a hold down system 2 made in accordance with the present invention is disclosed. The system 2 includes a foundation anchor 4 operably attached to a foundation 6 of a building. The foundation anchor 4 includes a threaded rod 8 attached to another threaded or tie-rod rod 10 by means of a coupling 12. A bridge member 14 spans between two adjacent studs 16 and is supported by a pair of reinforcement studs 18. A bearing plate 20 sits on top of the bridge member 14. The threaded rod 10 extends through the bridge member 14 and the bearing plate 20 through respective openings. A hold down device 22 is secured between the bearing plate 20 and a nut 24. The hold down device 22, which will be described below, is an expanding fastener assembly used to take up any slack that may develop in the tie-rod 10 due to shrinkage in the building wall.

FIG. 1 discloses a hold down system as used in a one story structure. The reinforcement studs 18 terminate between the top plate 26 and the bottom plate 28.

It should be understood that building foundation is used to refer generally to any structure that is used to anchor or tie a building to the ground. Examples are foundation walls, horizontal beams connected to vertical beams driven or buried in the ground, or any substantial structure solidly anchored in the ground. Accordingly, a building foundation can be any structure that is capable of transferring the load of the building to the ground.

Figure 2:
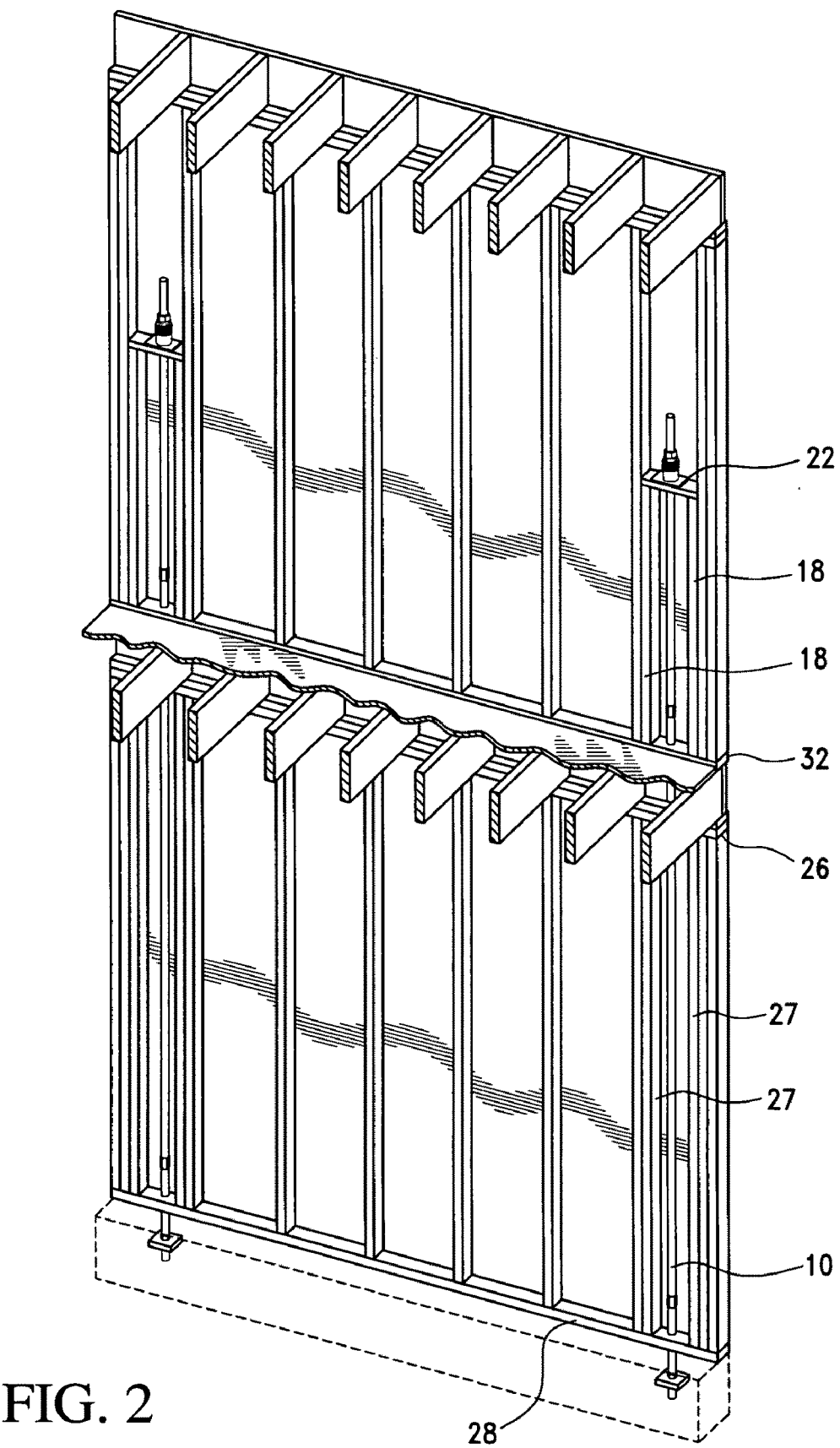
FIG. 2 is a stud wall of a two story building incorporating a hold down system made in accordance with the present invention.

FIG. 2 is an application of the hold down system 2 in a two story building. The hold down device 22 is disposed within the stud wall of the second floor. Reinforcement studs 27 extending from the bottom plate 28 to the top plate 26 are provided in the wall below the reinforcement studs 18 installed in the second floor wall. The bottom ends of the reinforcement studs 18 rest on the bottom plate 32 of the second floor wall.

Figure 3:
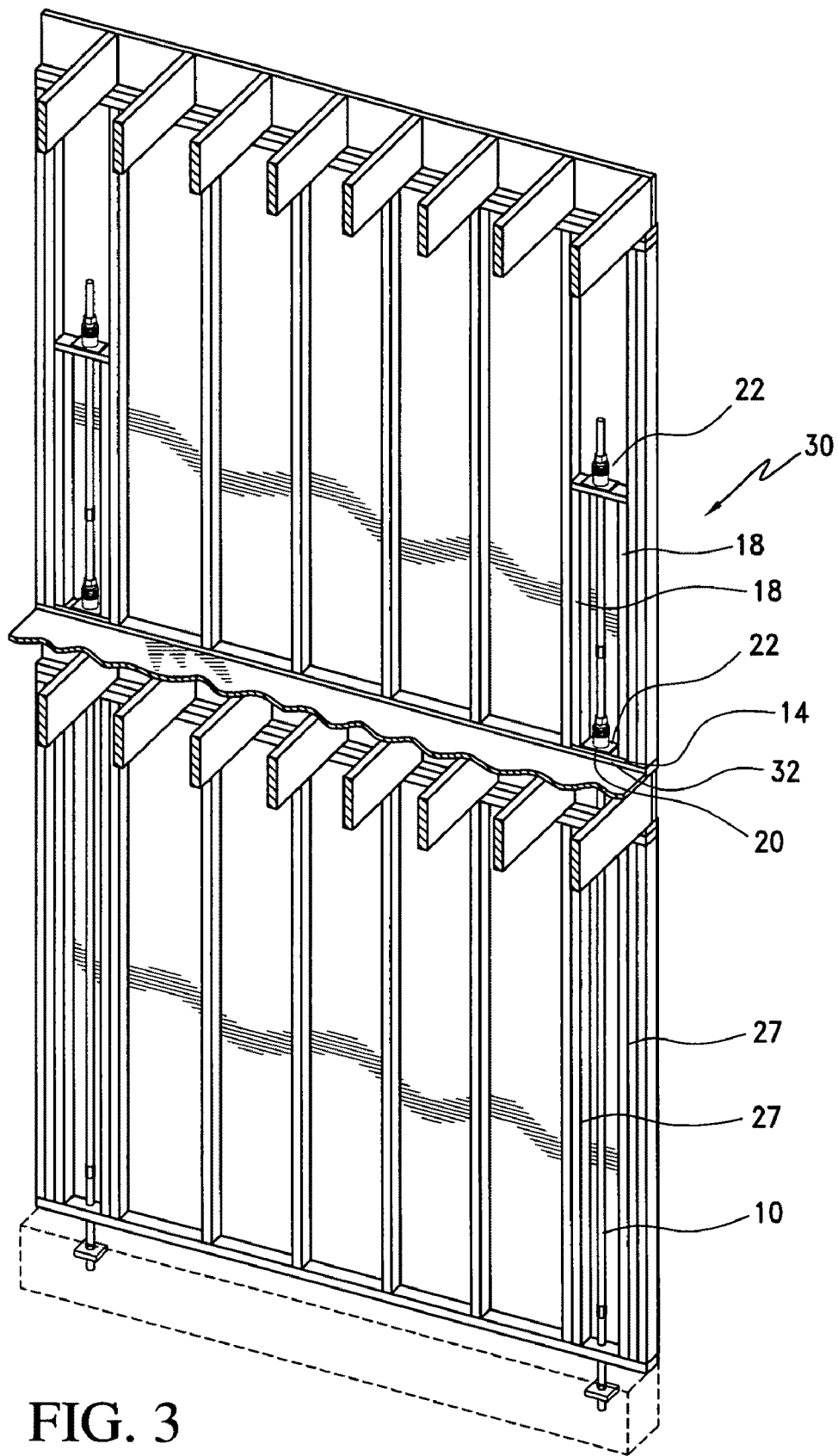
FIG. 3 is a perspective view of a stud wall of a two story building, incorporating a hold down system made in accordance with the present invention.

FIG. 3 shows another embodiment of a hold down system 30 as applied to a two story building. The components are the same as the hold down system 2 shown in FIG. 1, except that a second hold down device 22 is disposed near the bottom plate 32 of the second floor wall. A second bridge member 14 bears directly on the bottom plate 32. A second bearing plate 20 bears on top of the second bridge member 14. The bottom ends of the reinforcement studs 18 bear down on the top surface of the second bridge member 14.

Figure 4:
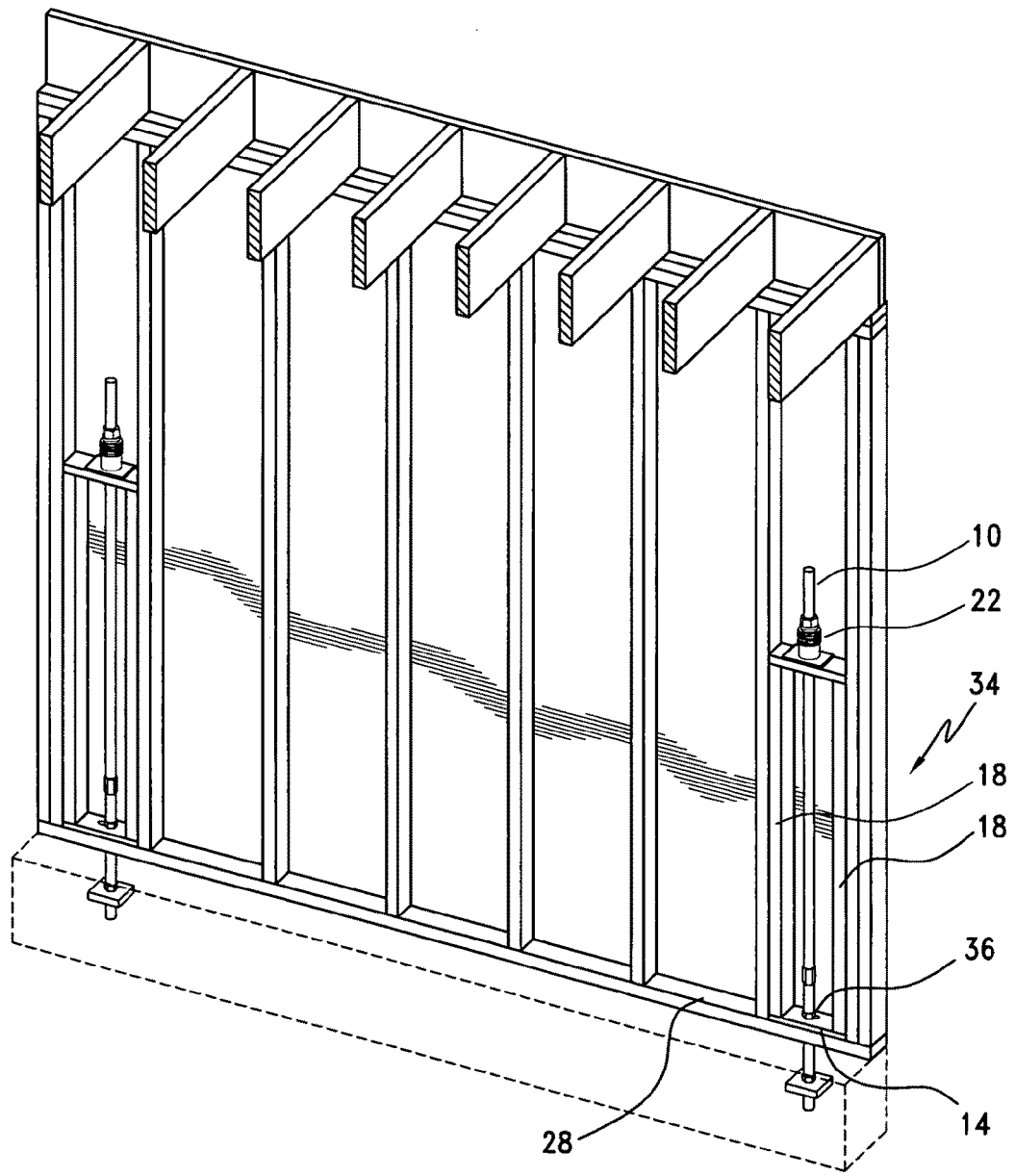
FIG. 4 is a perspective view of a stud wall using a hold down system made in accordance with the present invention.

Another embodiment of a hold down system 34 is disclosed in FIG. 4 in a one story application. The system 34 is similar to the system disclosed in FIG. 1, except that a second bridge member 14 is disposed on the bottom plate 28 and secured by a nut 36 holding the second bridge member 14 tight against the bottom plate 28. The second bridge member 14 advantageously provides a bearing surface against the bottom plate 28 for distribution of forces that may tend to lift the wall off the foundation. The bottom ends 38 of the reinforcement studs 18 bear on top of the second bridge member 14.

Figure 5:
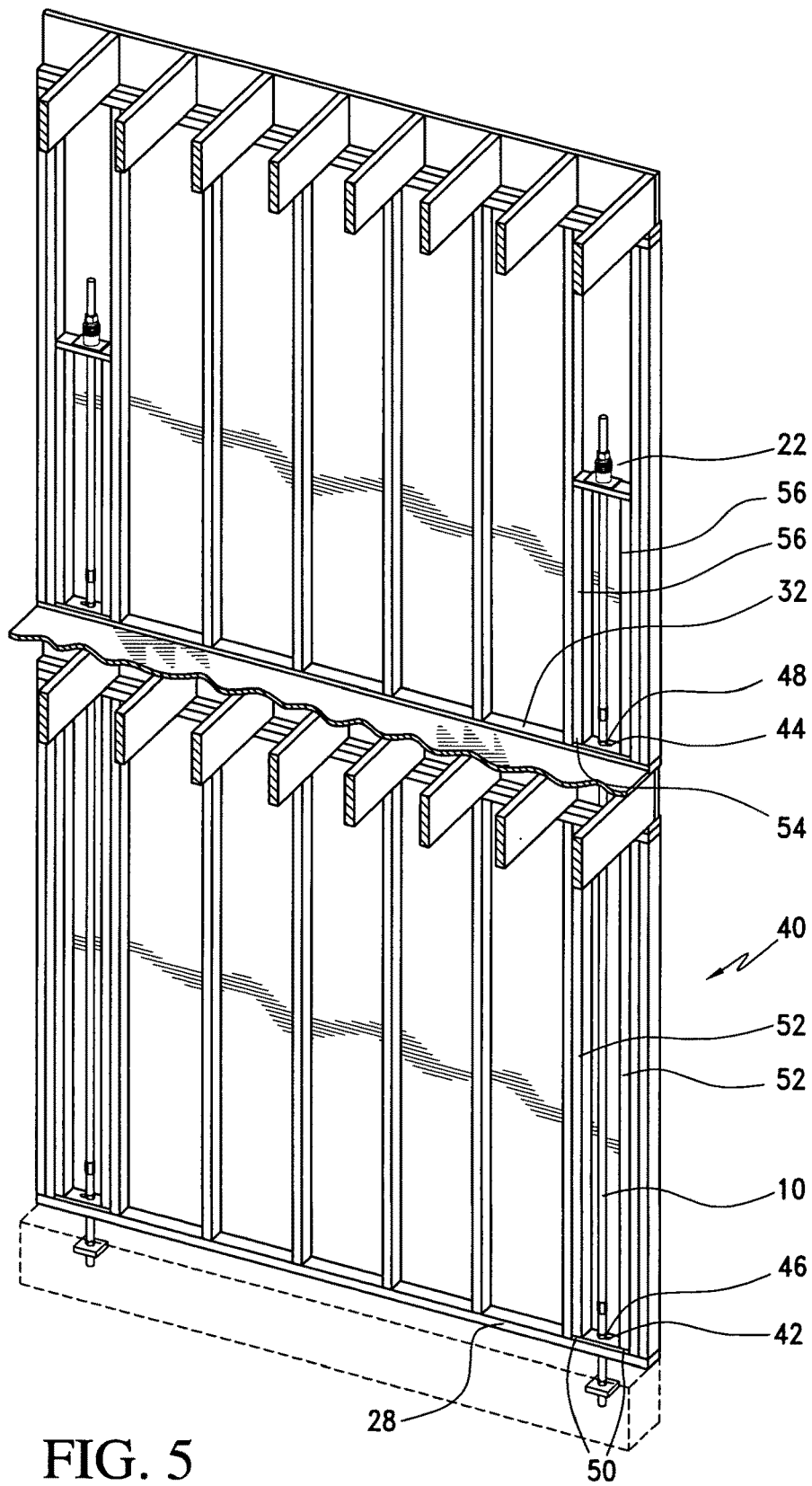
FIG. 5 is a perspective view of a stud wall of a two story building utilizing a hold down system made in accordance with the present invention.

Another embodiment of a hold down system 40 is disclosed in FIG. 5 in a two story application. The system 40 is similar to the system disclosed in FIG. 2, except that additional bridge members 42 and 44 are used. The bridge member 42 bears on top of the bottom plate 28 of the first floor wall, while the bridge member 44 bears on top of the bottom plate 32 of the second floor wall. A nut 46 secures the bridge member 42 to the tie rod 10 and helps secure the bottom plate 28 to the foundation. Similarly a nut 48 secures the bridge member 44 to the bottom plate 32 and to the tie-rod 10. The bottom ends 50 of the reinforcement studs 52 bear on top of the bridge member 42. The bottom ends 54 of the reinforcement studs 56 similarly bear on top of the bridge member 44. The reinforcement studs 52 extends the full height of the first floor wall, while the reinforcement studs 56 are shorter than the height of the second floor wall.

Figure 6:
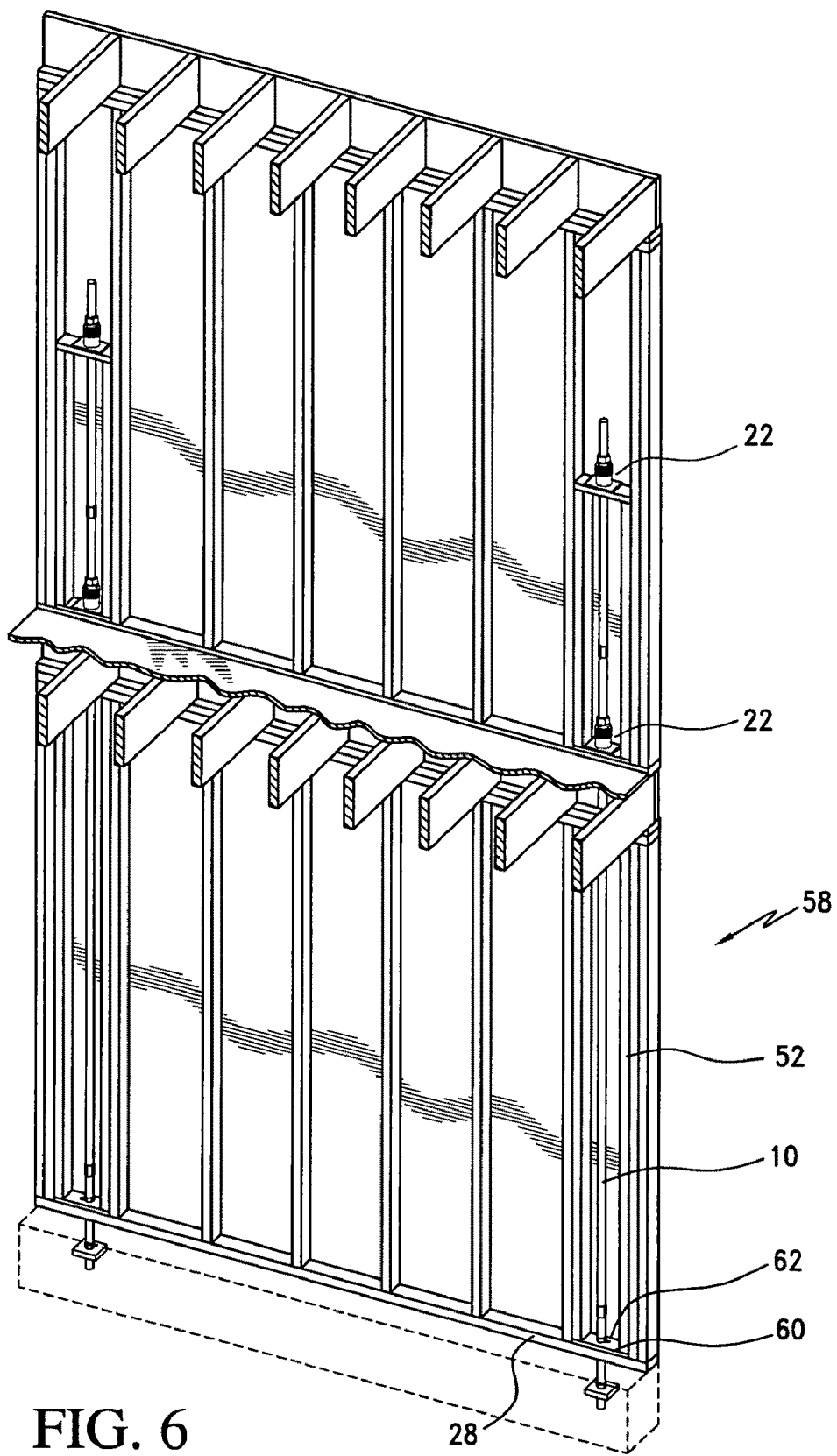
FIG. 6 is a perspective view of a stud wall of a two story building using a hold down system made in accordance with the present invention.

FIG. 6 discloses another embodiment of a hold down system 58 used in a two story building. The system 58 is similar to the system disclosed in FIG. 3, except that an additional bridge member 60 is provided that bears down on top of the bottom plate 28 and a nut 62 secures the bridge member 60 to the threaded rod 8. The ends of the reinforcement studs 52 bear down on top of the bridge member 60.

Figure 7:
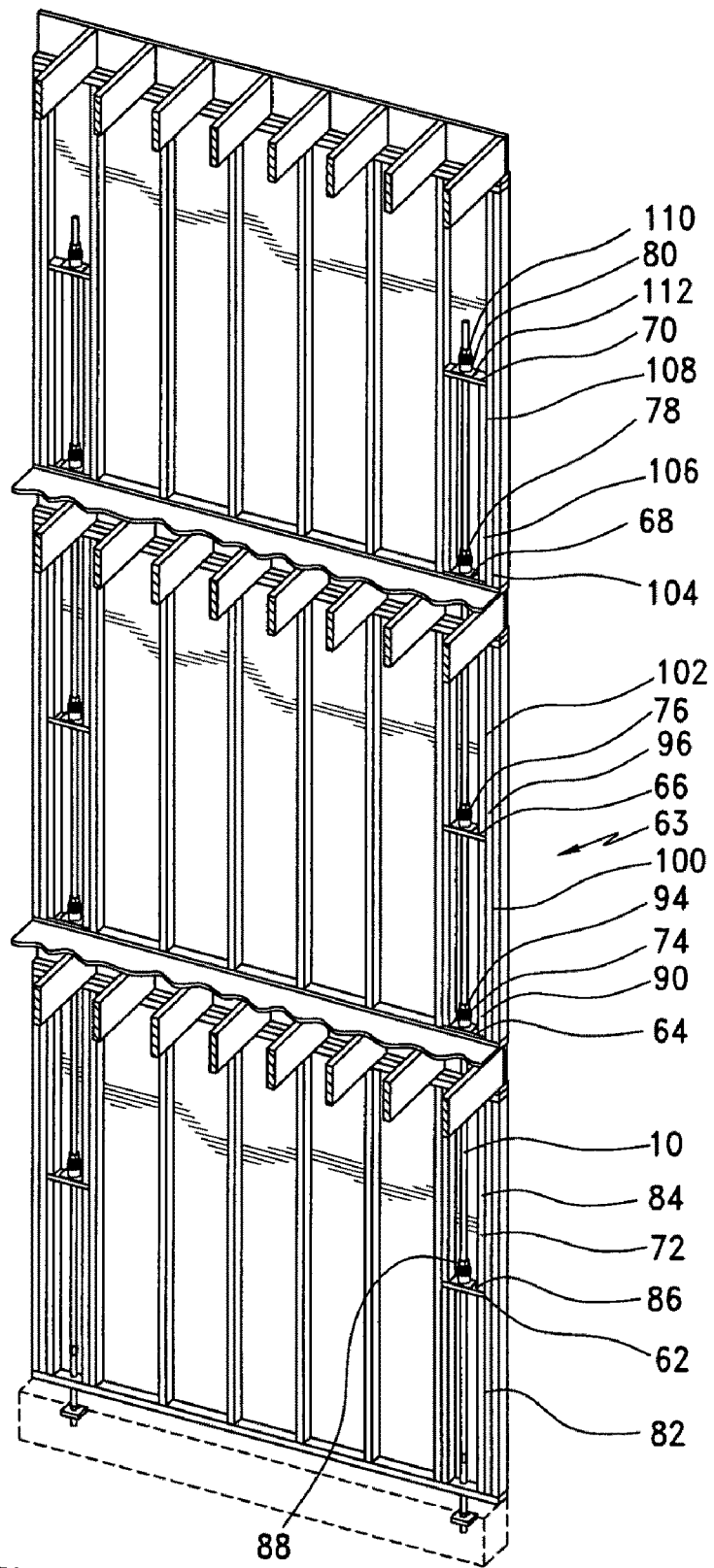
FIG. 7 is a perspective view of a stud wall of a three story building using a hold down system made in accordance with the present invention.

Another embodiment of a hold down system 63 applied to a three story building is disclosed in FIG. 7. The tie-rod 10 extends inside the stud wall through the first floor wall, second floor wall and terminates in the third floor wall. Bridge members 62, 64, 66, 68 and 70 along with hold down devices 72, 74, 76, 78 and 80 keep the tie rod 10 under tension. The bridge member 62 is supported by reinforcement studs 82 and 84 with the adjacent ends of the reinforcement studs sandwiching the respective ends of the bridge member 62. The hold down device 62 is disposed between a bearing plate 86 and a nut 88.

The hold down device 74 also bears down on a bearing plate 90 supported by the bridge member 64, which in turn bears down on the bottom plate. A nut 94 secures the hold down device 74 to the tie rod 10. The bottom ends of the reinforcement studs 100 bear down on the bridge member 64, transferring the load to the bottom plate and to the reinforcement studs 84 and 82 below.

The hold down device 76 along with its bridge member 66 and a bearing plate 96 and its respective nut 98 are similarly installed as the hold down device 62. The reinforcement studs 100 and 102 similarly secure the bridge member 66 to the stud wall. The reinforcement studs 102 bear down on the bridge member 66, transferring the load to the reinforcement studs 100.

The hold down device 78 along with its bridge member 68, its bearing plate 104 and nut 106 are similarly secured as the hold down device 74. The ends of reinforcement studs 108 bear down on the bridge member 68, transferring the load to the base plate and to the reinforcement studs 102 below.

The bridge member 70 is supported on the top edge of the reinforcement studs 108 and is secured to the tie rod with nut 110. Bearing plate 112 is disposed between the bridge member 70 and the hold down device 80.

The various hold down systems disclosed above are shown installed within the first stud bay from the end of a shear wall using standard wood framing construction. However, the hold down systems are not limited to these locations or type of construction. They may be installed in any stud wall construction to resist uplift during high wind or earthquake conditions. The hold down system may be installed in the first stud bay at the first bay after a window or door opening. Generally, the hold down system may be installed anywhere inside a stud wall as the application dictates.

Figure 8:
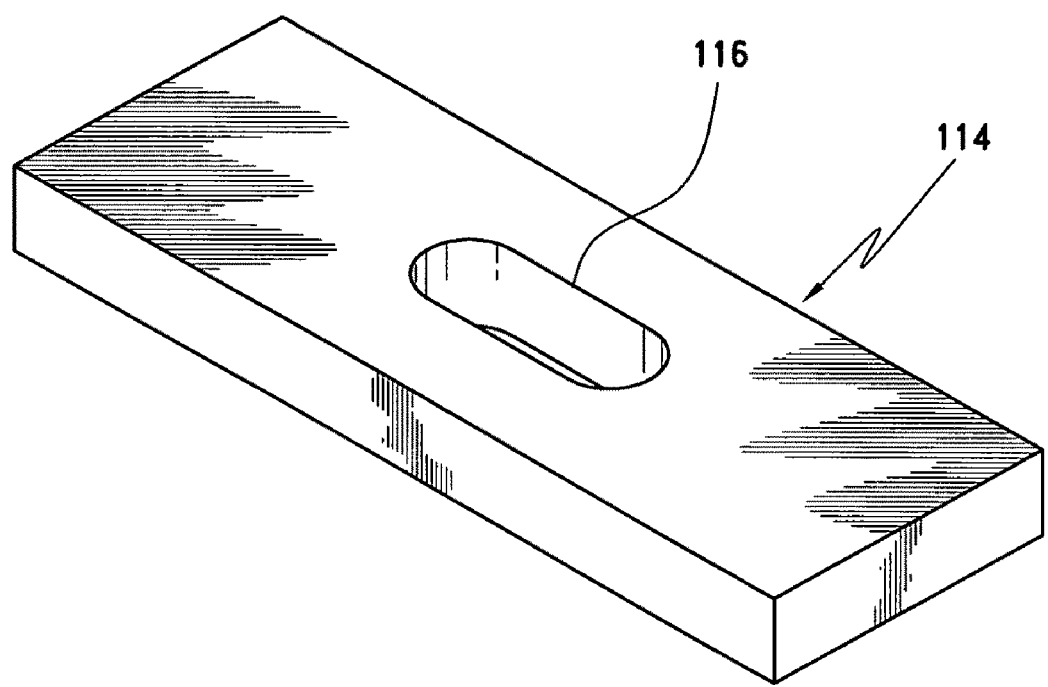
FIG. 8 is a perspective view of a bridge or cross member used in a hold down system shown in FIGS. 1-7.

Referring to FIG. 8, a bridge member 114 used in the various embodiments of the hold down system of FIGS. 1-7 is disclosed. The bridge member 114 is a rectangular metallic block having a slotted opening 116 through which the threaded rod 10 extends. The opening 116 is centrally located and advantageously allows the threaded rod 10 to be slightly off center and off vertical when installed through the stud wall. The bridge member 114 is preferably made of aluminum, but other materials such as steel or non-metal materials may also be used. The metallic bridge member 114 simplifies the installation of a hold down system, requiring less number of components as compared to using a wood bridge typically made of several wood members. The metal bridge member 114 advantageously provides for higher loads as compared to wood bridge members, since "parallel to grain of lumber" loading is used (typically 1200 psi), as compared to "perpendicular to grain of lumber" loading when using wood bridge members (typically 625 psi). Referring to FIG. 7, the use of metallic bridge members 62 and 66 where the reinforcement studs 84 and 102 bear down from above advantageously eliminates the "perpendicular to grain" loading of prior art wood bridge member, thereby increasing the loading capacity of the hold down system. The bridge member 114 may be color coded for material type, capacity and dimensional size.

The bridge member 114 is also used as a baseplate compression plate as shown in FIGS. 3, 4, 5, 6 and 7. As load passes through the support studs and or wall studs through the parallel wood grain, this surface is in bearing contact with each end of the metallic baseplate. The use of the bridge member as a base-plate-compression plate lowers the compression force per square inch upon the perpendicular wood bearing surface below. As load is transferred from the support studs and or wall studs through the metallic baseplate, the load is dispersed and spread out because the metallic baseplate is minimally designed not to bend or deflect. The physical properties of the metallic baseplate provide this behavior when used in this fashion. So a concentrated force from the contact point of the studs at each end of the top the metallic baseplate is then spread out over the large area of contact to the perpendicular wood bearing surface underneath the metallic baseplate.

Placement of the metallic baseplate and bridge member is intended for the relative center of the first stud bay of a wall in a building which uses wall studs of many different types of framing material. They may also be installed at each end of a wall. They ma also centrally be located in any stud bay of a wall or every stud bay of a wall. The transfer of parallel to grain force or load from support studs and or wall studs bearing upon the upper top side of the metallic bridge block is transferred to the lower support studs and or wall studs through the metallic bridge member. The metallic bridge member physical properties do not allow any crushing or displacement between studs parallel to grain bearing surfaces; therefore force or load is transferred with a stable load path.

Bridge member or baseplate compression plate is not limited to metallic materials. The physical properties of the cross member and or baseplate compression plate must be equal to or greater than the physical properties of the support studs bearing surface.

Bridge member and/or baseplate compression plate can be employed to resist uplift and rotation of a wall of a building and also are utilized when the wall in a compression mode. Because of behaviors described earlier above the bridge member and/or baseplate compression plate disperses loads and achieves lowering concentrated forces between bearing surfaces when down-load forces occurs. This advantageously helps solve load path problems in current hold down systems.

Various embodiments of a hold down device as used in the hold down systems of FIGS. 1-7 will now be described. A person of ordinary skill in the art will appreciate that the various components disclosed for each hold down device may be interchanged, substituted, added, or deleted as desired by the application.

A hold down device 118 made in accordance with the present invention is disclosed in FIGS. 9-13. The hold down device 118 is shown attached to the tie rod 10 by means of a nut 120, bearing plate 122 and the bridge member 114. The hold down device 118 includes an inner cylinder 124 slidably disposed within an outer sleeve or cylindrical member 126. A top cylinder or sleeve 128 is secured to an upper portion of the inner cylinder 124. A coil spring is compressed between the top cylinder 128 and the outer sleeve 126. A convex washer is disposed between the nut 120 and the inner cylinder 124. The washer 132 has a convex surface 134 which matches a corresponding concave surface on the upper edge portion of the inner cylinder 124. The inner cylinder has central opening 138 which is larger than the diameter of the threaded rod 10 to allow the rod to be slightly off vertical within the inner cylinder 124. The opening 138 also flares out to a larger diameter at the top portion of the inner cylinder 124 (see FIGS. 11 and 12 and FIGS. 28 and 29) to allow even further leeway for the tie-rod to be off perpendicular with respect to the bridge member 114. The convex surface 134 and the concave surface 136 are advantageously in full bearing contact when the threaded rod 10 is slightly off vertical.

The top cylinder 128 is secured to the inner cylinder 124 by means of a C-ring or resilient member 140 captured in a circumferential groove or receiving volume 142 around the outside cylindrical surface of the inner cylinder 124 and an inner circumferential groove or receiving volume 144 along the inner cylindrical surface of the top cylinder 128. The grooves 142 and 144 are configured with the same geometry as disclosed in U.S. Pat. No. 6,951,078, hereby incorporated by reference. The geometry of the grooves 142 and 144 is such that the top cylinder 128 is prevented from sliding upwardly with respect to the inner cylinder 124, but is able to slide downwardly for assembly purposes. The lower portion of the inner cylinder 124 includes a plurality of circumferential grooves or receiving volumes 146 with the same geometry as the circumferential groove 142. Similarly, the inner cylindrical surface of the outer sleeve 126 has a plurality of circumferential grooves or receiving volumes 148 that has the same geometry as the circumferential groove 144. A plurality of C-rings or resilient members 150 are disposed around the grooves 146. The grooves 146 and 148 allow the vertical sliding movement of the inner cylinder 124 with respect to the outer sleeve 126. An annular groove 151 is disposed adjacent the bottom edge of the inner cylinder 124 for use with a removable spring clip 188 (see, for example, FIG. 24) prior to installation. The groove 151 is present in the other embodiments shown in FIGS. 14-21.

Details of the grooves 146 and 148 are disclosed in FIG. 13. Downward movement of the outer sleeve 126 will cause the C-ring 150 into the groove 146, which is sized to completely receive the cross-sectional area of the C-ring, thereby allowing further movement of the outer sleeve 126. On the other hand, upward movement of the outer sleeve 126 is prevented, since the groove 148 is not large enough to accommodate the entire cross-sectional area of the C-ring 150.

In operation, the spring 130 is under compression, as shown in FIG. 11. The threaded rod 10 is under tension from the action of spring 130, which tends to pull the threaded rod 10 upwardly. As the building wall shrinks over time, the bridge member 114 would move downwardly with the shrinkage of the wall. This causes the spring 130 to push the outer sleeve 126 downwardly while at the same time pushing the top cylinder 128 upwardly, thus causing the inner cylinder 124 to move upwardly. With these relative motions, tension on the threaded rod 10 is thus maintained. Once the hold down device 118 has expanded as shown in FIG. 12, it is prevented from contracting back to its original position as shown in FIG. 11 by virtue of the geometry of the cooperating grooves 146 and 148 as explained above.

The top cylinder 128 has outer helical (thread-like) grooves 152 for receiving an end portion of the spring 130. Similarly, the outer sleeve 126 has outer helical (thread-like) grooves 154 for receiving the opposite end portion of the spring 130. The grooves 152 and 154 keep the top cylinder 128 and outer sleeve 126 attached to each other via the spring 130.

Figure 16:
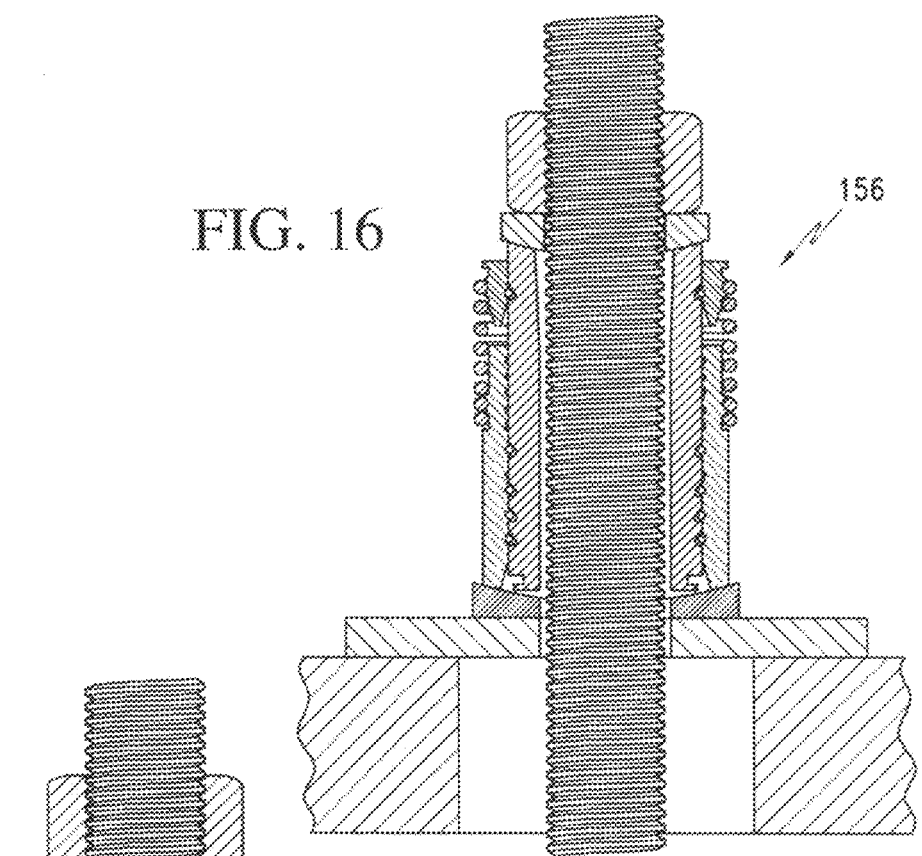
FIG. 16 is a cross-sectional view of FIG. 14, showing the hold down device in a retracted position, prior to taking up the shrinkage in the stud wall.
Figure 17:
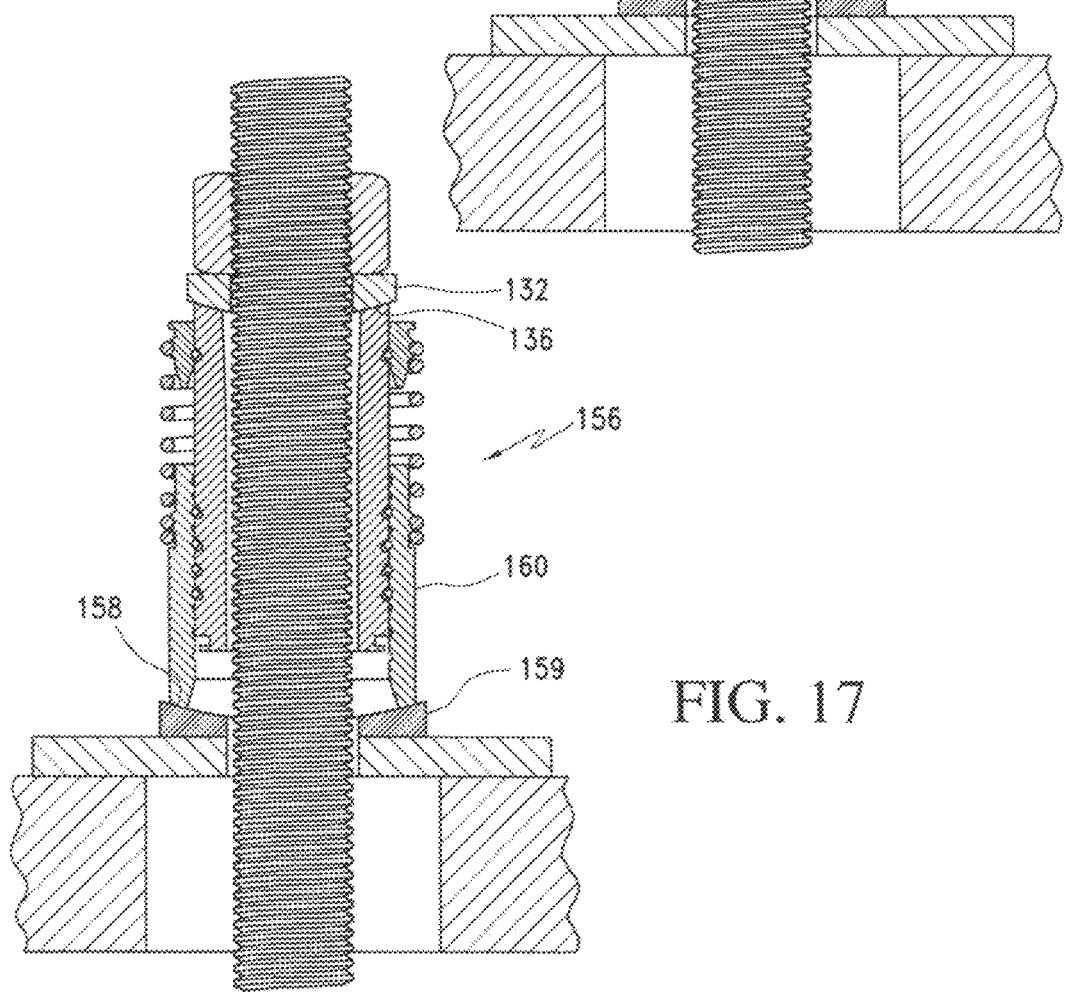
FIG. 17 is a cross-sectional view of the hold down device of FIG. 14, shown in a partially extended position after taking up the shrinkage in the stud wall.
Figure 18:
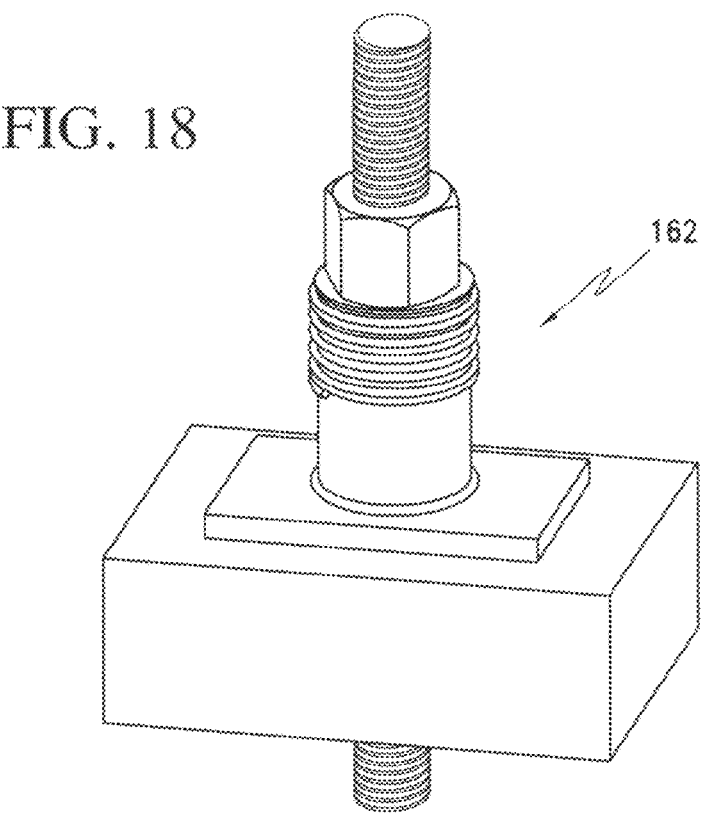
FIG. 18 is a perspective view of another embodiment of a hold down device made in accordance with the present invention.
Figure 19:
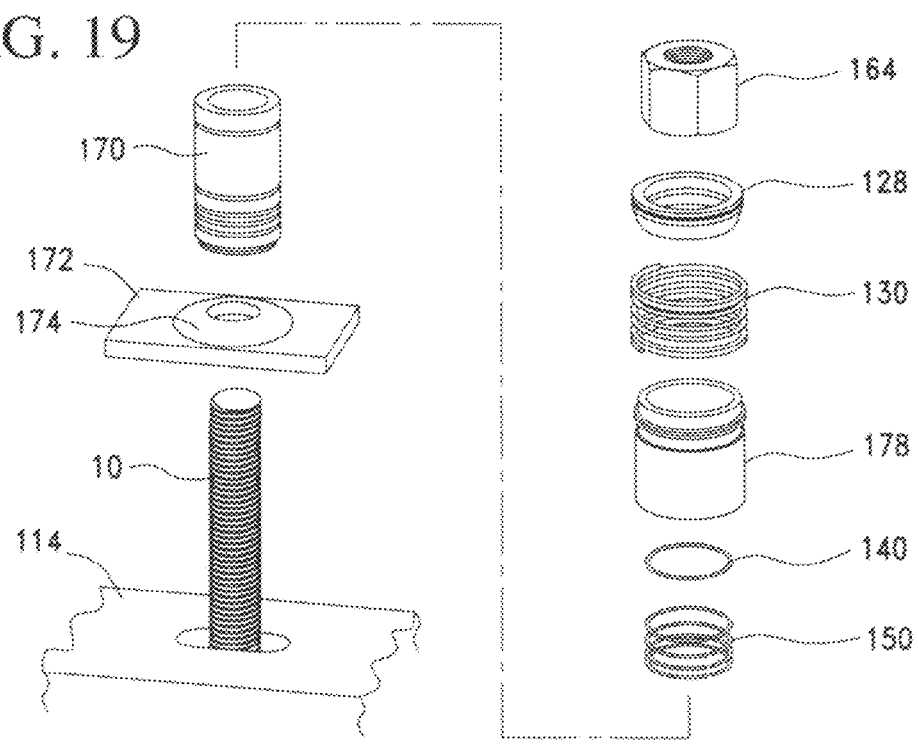
FIG. 19 is an assembly view of FIG. 18.

Another embodiment of a hold down device 156 is disclosed in FIGS. 14-17. The hold down device 156 is identical to the hold down device 118 except for the provisions of a concave washer 158 welded to the bearing plate 122 and the provision of a convex outer edge surface 159 on the outer cylinder 160. The hold down device 156 advantageously allows for a greater deviations from the vertical for the threaded rod 10 while still maintaining full bearing contact between the outer cylinder 160 and the concave washer 158 and between the convex washer 132 and the concave edge surface of the inner cylinder 136, since adjustment at the convex washer 132 is independent of the adjustment at the concave washer 158. FIG. 16 shows the hold down device 156 in a retracted position. FIG. 17 shows the hold down device 156 in an expanded position after the building wall has shrunk and the hold down device 156 has taken up the resulting slack in the threaded rod 10, thereby keeping the threaded rod 10 in tension.

Figure 20:
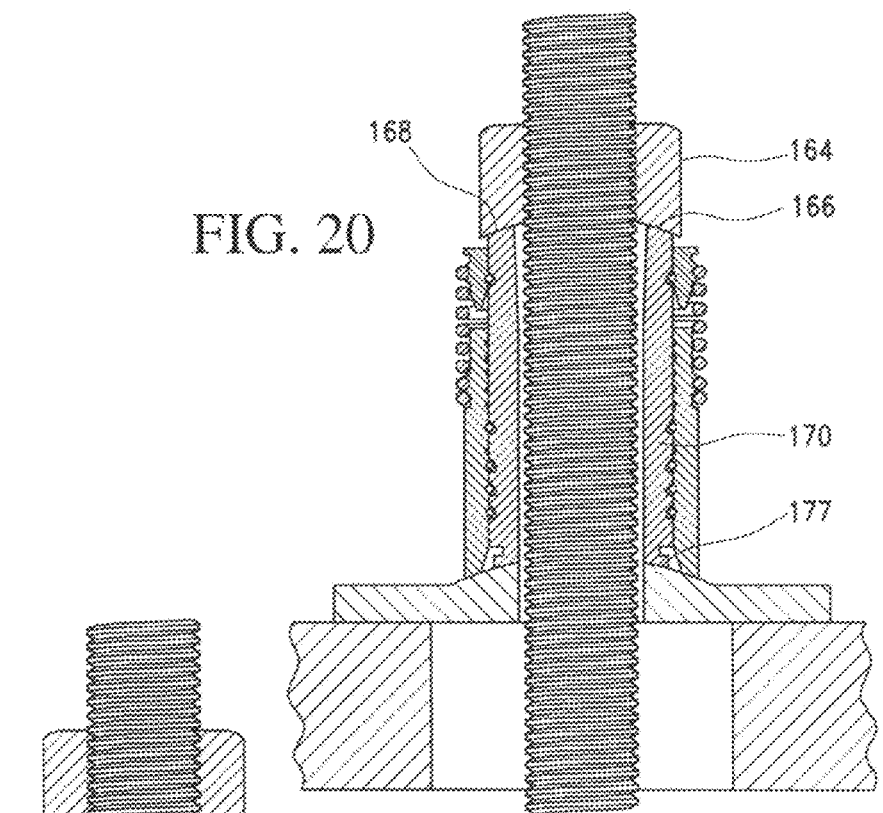
FIG. 20 is a cross-sectional view of FIG. 18, showing the hold down device in a retracted position prior to taking up the shrinkage in the stud wall.
Figure 21:
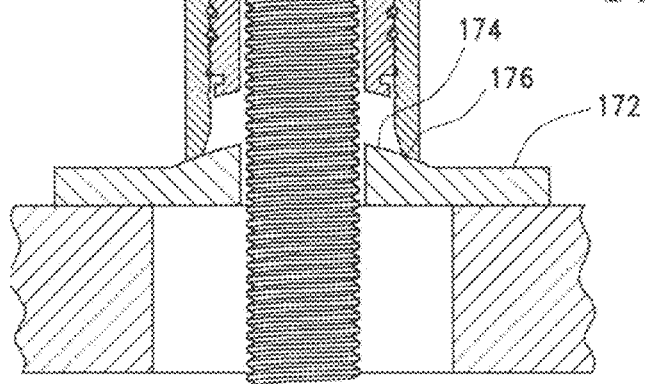
FIG. 21 is a cross-sectional view of FIG. 18, showing the hold down device in a partially extended position after taking up the shrinkage in the stud wall.
Figure 22:
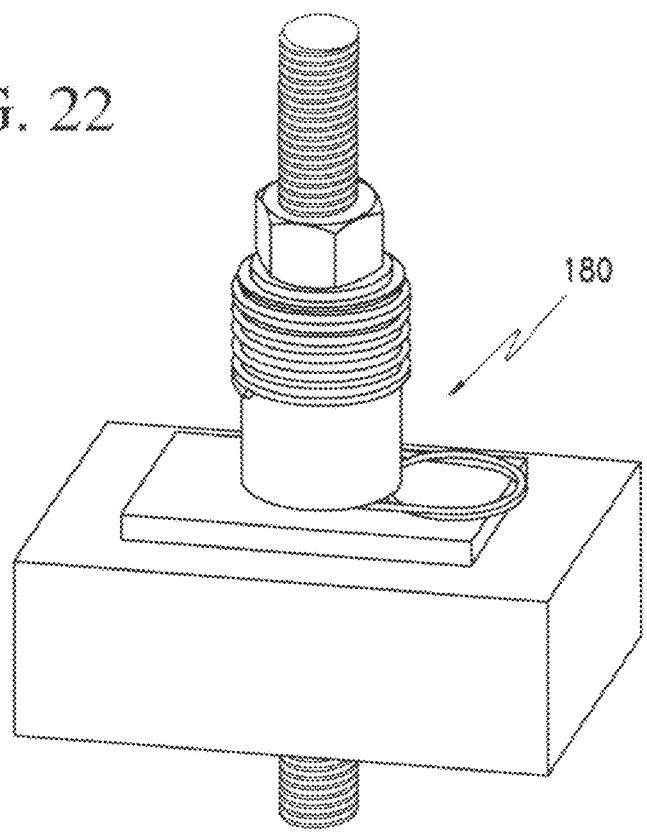
FIG. 22 is a perspective view of another embodiment of a hold down device.

Another embodiment of a hold down device 162 is disclosed in FIGS. 18-21. The hold down device 162 is similar to the other disclosed hold down devices, except for some features. A nut 164 has a concave surface 166 that mates with the corresponding convex edge surface 168 on the inner cylinder 170. The bearing plate 172 has a convex surface 174 that mates with a concave edge surface 176 on the outer sleeve or cylindrical member 178. The bottom edge 177 of the inner cylinder 170 also includes a mating concave surface. All the other components of the hold down device 162 are identical to similar components in the previously described hold down devices. FIG. 20 shows the hold down device 162 in a retracted position while FIG. 21 shows the device in the extended position after taking up the shrinkage in the wall.

Figure 23:
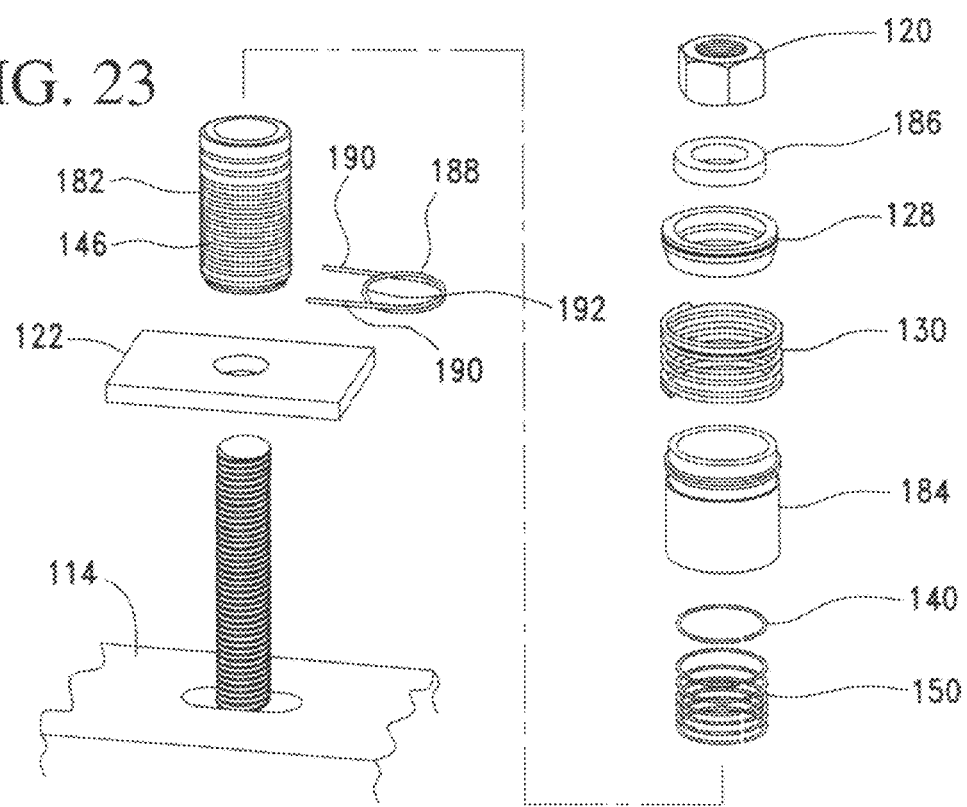
FIG. 23 is an assembly view of FIG. 22.
Figure 24:
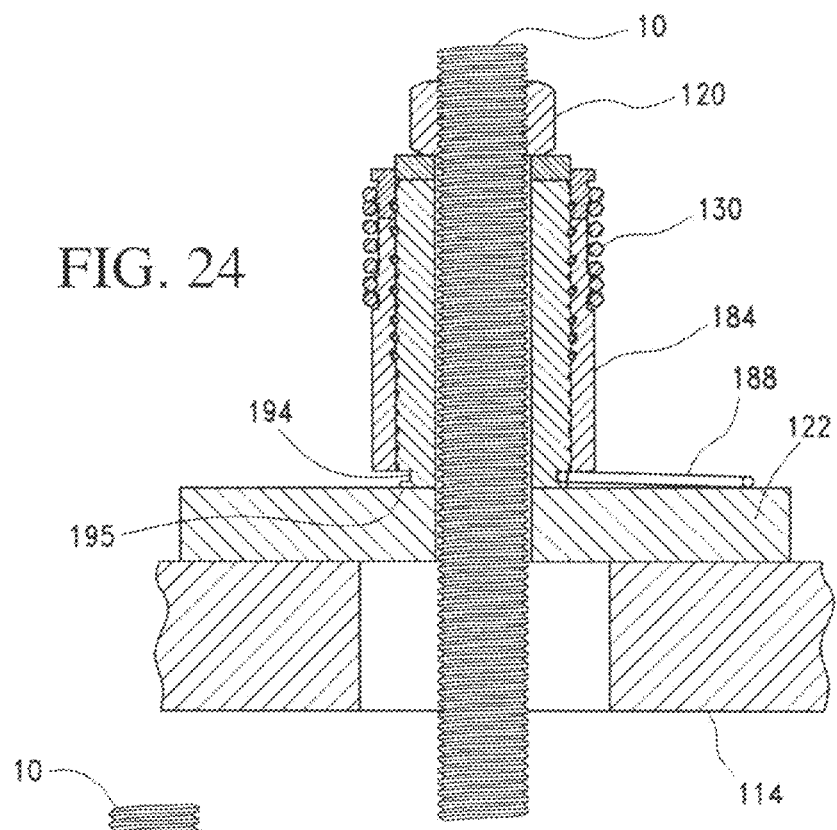
FIG. 24 is a cross-sectional view of FIG. 22, showing the hold down device in a retracted position prior to being activated after installation in the stud wall.
Figure 25:
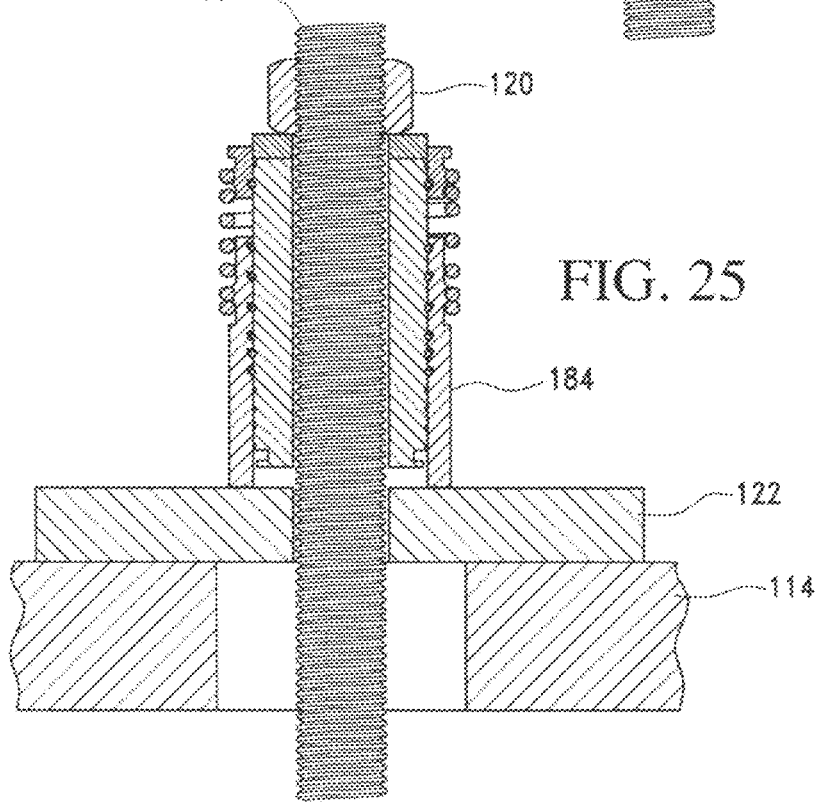
FIG. 25 is a cross-sectional view of FIG. 22, showing the hold down device in a partly extended position after been having been activated and taken up the shrinkage in the stud wall.
Figure 26:
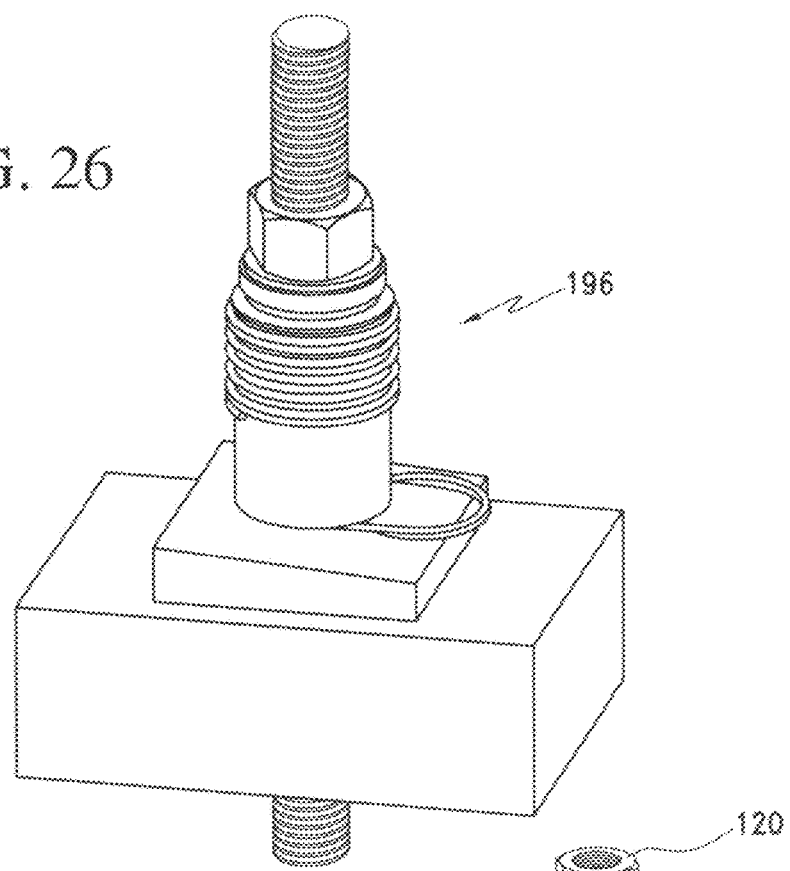
FIG. 26 is a perspective view of another embodiment of a hold down device made in accordance with the present invention.
Figure 27:
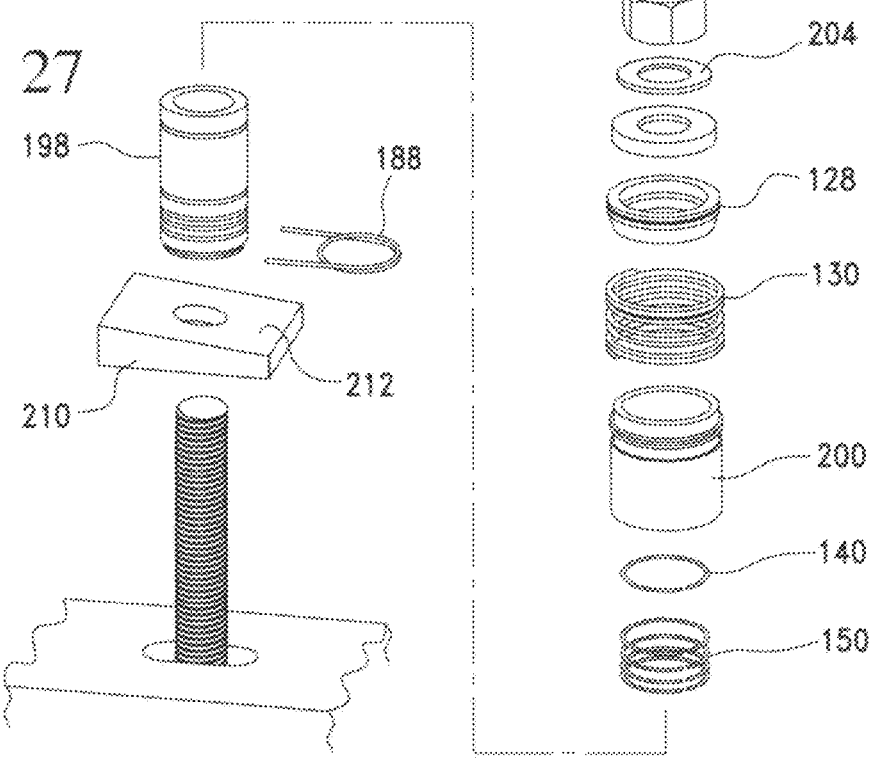
FIG. 27 is an assembly view of FIG. 26.
Figure 28:
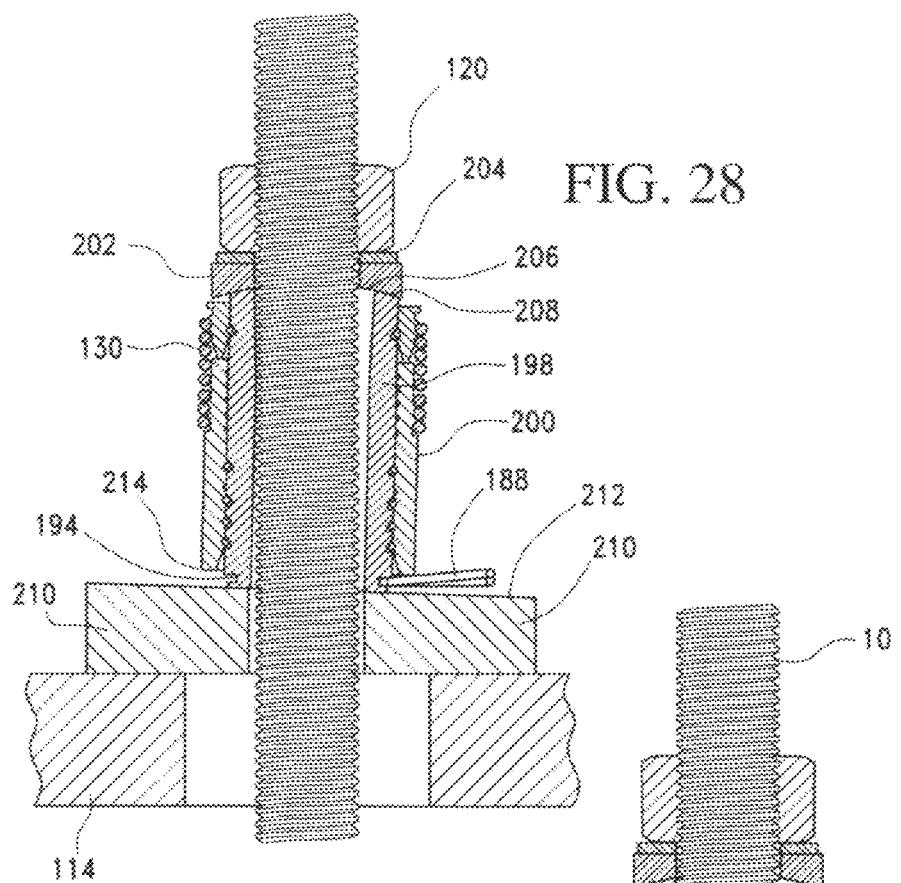
FIG. 28 is a cross-sectional view of FIG. 26, showing the hold down device in an off-vertical position and prior to being activated.
Figure 29:
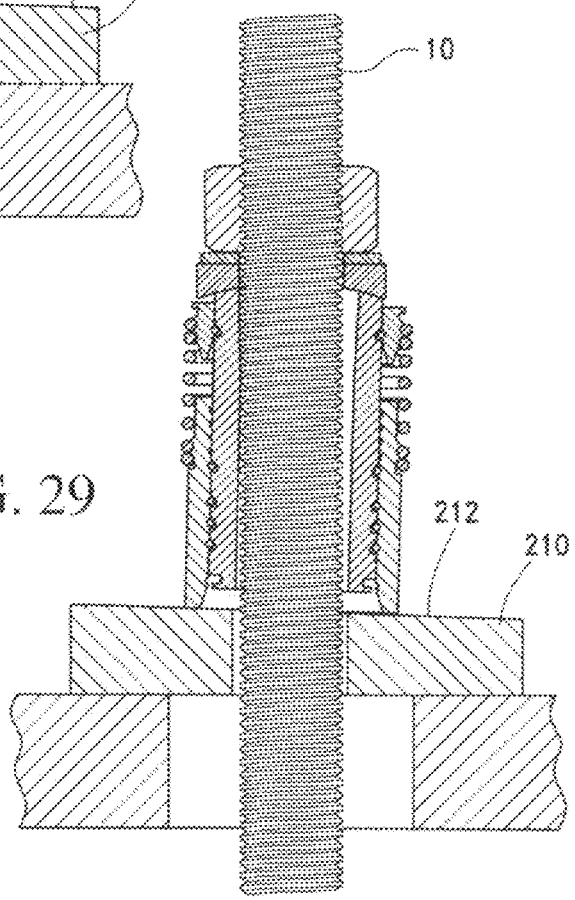
FIG. 29 is a cross-sectional view of FIG. 26, showing the hold down device in a partly extended position after having been activated.

Another embodiment of a hold down device 180 is disclosed in FIGS. 22-25. The hold down device 180 includes an inner cylinder 182 and outer sleeve or cylindrical member 184, a top cylinder or sleeve 128, a flat washer 186 and a nut 120. As in the other embodiments, spring 130, C-rings 140 and 150 are also provided. The inner cylinder 182 includes a greater number of circumferential grooves 146, a corresponding number of circumferential grooves 148 on the inside cylindrical surface of the outer sleeve 184, and a corresponding number of C-rings 150. This is to advantageously provide for an increased load for the hold down device 180. A spring clip 188 advantageously allows the hold down device 180 to be preloaded (when the spring 130 is compressed) prior to installation. The spring clip 188 has two extending legs 190 and a portion 192 that slip into an annular groove 194 so that the outer sleeve 184 is stopped from moving downwardly due to the action of the compressed spring 130. Thus, the hold down device 180 can be installed with the spring 130 already loaded. After the hold down device 180 has been installed in place, as shown in FIG. 24, the spring clip 188 is then pulled out, allowing the outer sleeve 184 to bear down on the bearing plate 122, ready to take any slack on the threaded rod 10 due to any shrinkage in the wall, as shone in FIG. 25.

The annular groove 194 includes a bottom wall 195 which is smaller in outside diameter than the diameter of the inner cylinder 182 to prevent any deformations or roughness, such as burrs, on the bottom wall 195 from interfering with the inner cylindrical surface of the outer sleeve 184 in case such deformations or roughness are inadvertently formed when the spring clip 188 is pulled out. This feature of the annular groove 194 is present in all of the embodiments disclosed herein.

Figure 36:
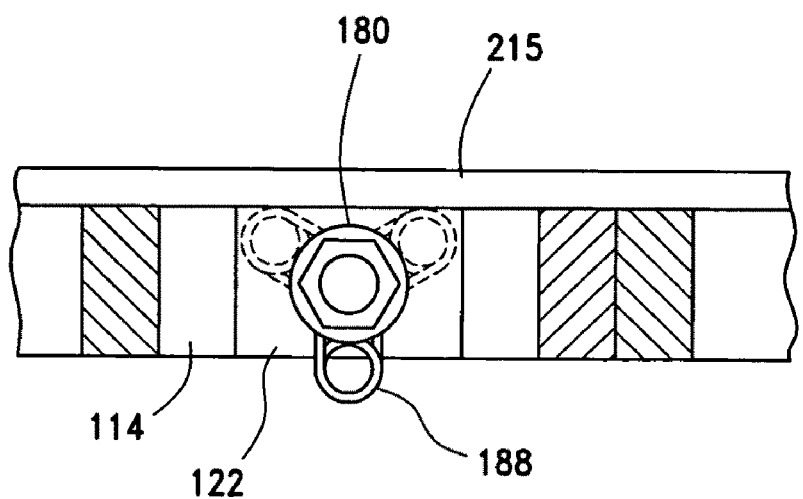
FIG. 36 is a cross-sectional view taken along line 36-36 in FIG. 32, showing the amount the spring clip extends out from the hold down device and its various positions, shown in phantom lines, around the hold down device.

Another embodiment of a hold down device 196 is disclosed in FIGS. 26-29. The hold down device 196 includes an inner cylinder 198, an outer sleeve or cylindrical member 200, a top cylinder 128, a concave washer 202, a flat washer 204, a nut 120, C-rings 140 and 150, a spring 130 and a spring clip 188. The concave washer 202 has a concave surface 206 that mates with a convex surface 208 on the upper edge of the inner cylinder 198. The spring clip 188 is removably retained within the groove 194 on the inner cylinder 198. A bearing plate 210 has a ramp surface 212 and is used to compensate for the misalignment of the threaded rod 10 out of the vertical. The ramp surface 210 disclosed is about 2° from the horizontal, but other angles may be incorporated depending on need. Additional compensation for the misalignment of the threaded rod 10 from the vertical is provided by the concave washer 202, as previously discussed in connection with the other embodiments. Prior to the spring clip 188 being pulled out to activate the hold down device 196, a gap 214 is advantageously clearly visible between the bottom edge of the outer sleeve 200 and the top surface of the bearing plate 210. The gap 214 may be used for quality control as an indicator on whether the hold down device has been activated or not. If the gap 214 exists, it means that the spring clip 188 has not yet been pulled out. The spring clip 188 extends out in such a distance that it cannot fit behind the hold down device and be hidden from view. Preferably, the spring clip 188 should stick out in front so that it will have to be pulled out before a wallboard can be installed, since it will be in the way of the wallboard. Referring to FIG. 36, the spring clip 188 extends a distance from the hold down device 180 such that it cannot be placed inadvertently between the wall sheathing 215 and the hold down device 180. In this manner, the spring clip 188 will always be visible, as shown in phantom lines, as a reminder to the installer that it needs to be pulled out before the wall is closed off. Note the larger and flared out opening at the top portion of the inner cylinder 198 that allows the tie-rod to be off-center with respect to the hold down device 196.

Figure 30:
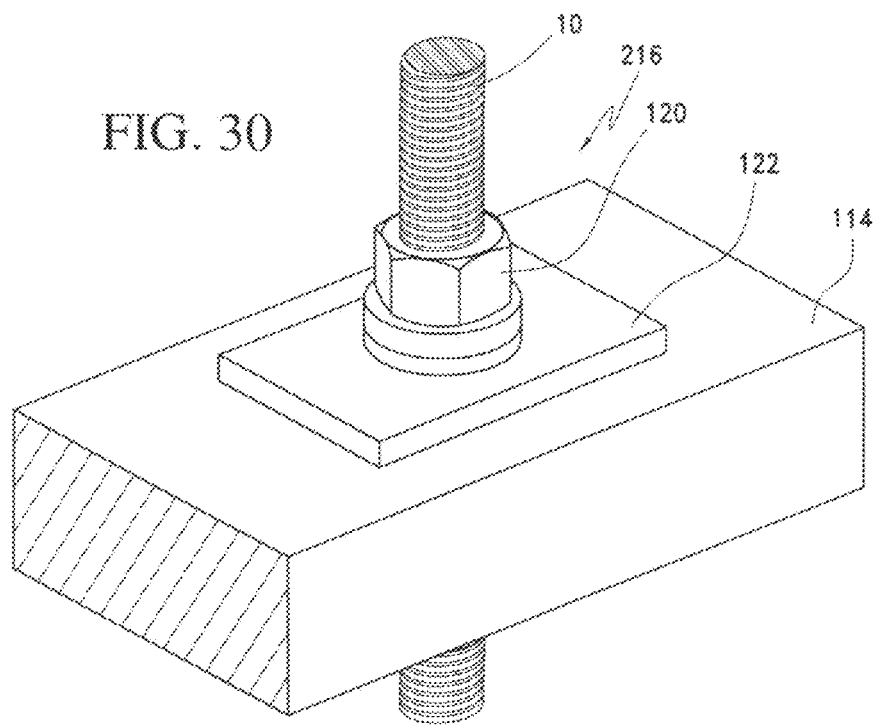
FIG. 30 is a perspective view of a hold down assembly made in accordance with the present invention.
Figure 31:
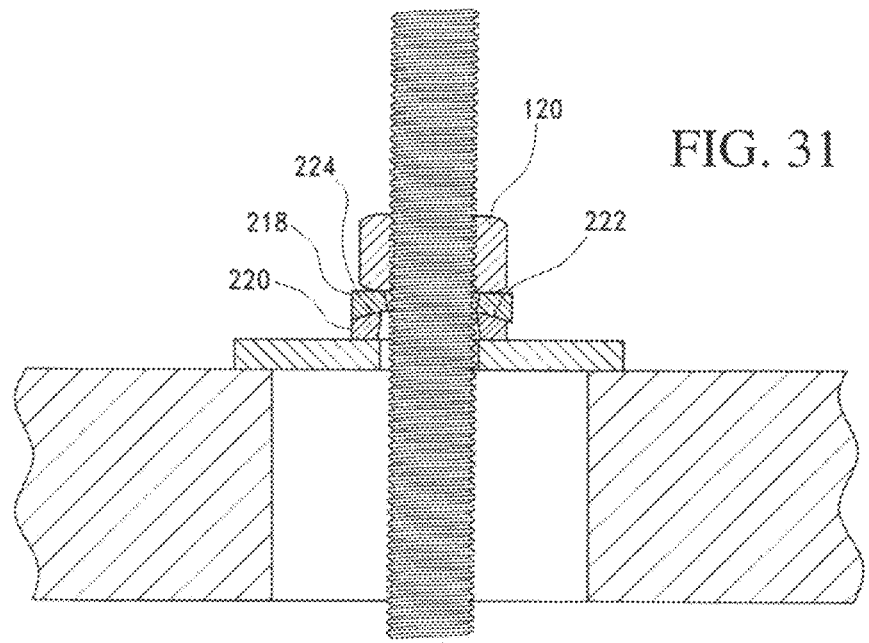
FIG. 31 is a cross-sectional view of FIG. 30.

An embodiment of a hold down assembly 216 is disclosed in FIGS. 30 and 31. The hold down assembly 216 includes the threaded rod 10 attached to the stud wall by means of the bridge member 114, bearing plate 122, a nut 120, concave washer 218 and convex washer 220. The concave washer has a concave surface 222 that mates with a corresponding convex surface 224 on the convex washer 220. The washers 220 and 222 allow the threaded rod 10 to be out of the vertical while maintaining a maximum bearing contact with the bearing plate 142. The washers 218 and 220 allow for centering the rod 10 while providing full bearing contact between bearing surfaces. The washers 218 and 220 may also be used in the embodiments shown in FIGS. 1-7 and 37 where a nut is used directly to hold down a bridge member without an intervening hold down device.

The convex and concave washers used in the various embodiments advantageously provide constant bearing area load transfer connections. The convex and concave washers advantageously provide for self centering installation where the threaded rod is out of the vertical. The convex and concave washers may be color coded to indicate the design load, capacity, hole size and/or diameter. The color coding may also indicate the amount of rotation or swivel provided. The convex or concave washers may be used on top or underneath the hold down device. The convex or concave washers may be integrated or fabricated onto the surface of the bearing plate. The use of convex and concave washers and correspondingly shaped edge surfaces on the hold down device advantageously allow for swivel or rotation when connected to tension members such as a threaded rod inside a wall that is not perpendicular to the bearing surface of the wall, thereby providing a constant bearing area between bearing surfaces.

The spring clip 188 is also used in the other embodiments of the hold down device, shown in FIGS. 9-21, although not shown therewith. Thus, the hold down devices disclosed herein are activated without use of tools.

The devices may also be reassembled and pre-loaded manually using one's hands and without the use of tools. Referring to FIGS. 23 and 24, for example, the spring 130 is attached to the outer cylinder or sleeve 184 and the top cylinder or sleeve 128. The C-rings 150 and 140 are placed within the circumferential grooves 146. The C-rings 150 and 140 will be loose, since they are biased toward the circumferential grooves 148 (see FIG. 13) on the inner surface of outer cylinder 184. The inner cylinder 182 is then inserted into the outer cylinder 184 from below. The retaining member legs 190 are inserted into the annular groove 194. The top cylinder or sleeve 128 and the spring 130 are then pressed down until the top cylinder 128 locks with the inner cylinder 124 via the C-ring 140.

The spring clip 188 cannot be hidden from sight when placed within or on a 2×4 and 2×6 typical framed wall. The clip's own dimension or diameter will not allow it to be rotated out of sight if any type of wall sheathing or wall board is present. This safeguard is so that the clip will not be forgotten and the device rendered un-activated and useless.

The various embodiments of the hold device disclosed herein provides linear non-rotating or axial motion that slides over and around various common tension materials, such as the tie-rod 10, with common hardware fastener connection. The hold down devices may be color coded to indicate travel or stroke length, capacity of useable force or load, and/or inside or outside diameter of the inner cylinder.

The spring 130 is designed and/or engineered to have a potential energy equal to or greater than the weight of the length of the tie-rod or cable (when used) below the hold down device extending to the next below hold down device or to the foundation anchor. The spring 130 may also be designed or engineered to have a minimum tension or force equal to or greater than the weight of the tie-rod or cable at full travel stroke length or designed displacement of the device. In this manner, the tie-rod or cable is advantageously fully supported throughout its length, regardless of the amount of travel of the of the outer sleeve relative to the inner cylinder, thereby preventing any buckling or bowing of the tie-rod or cable due to its own weight.

Figure 32:
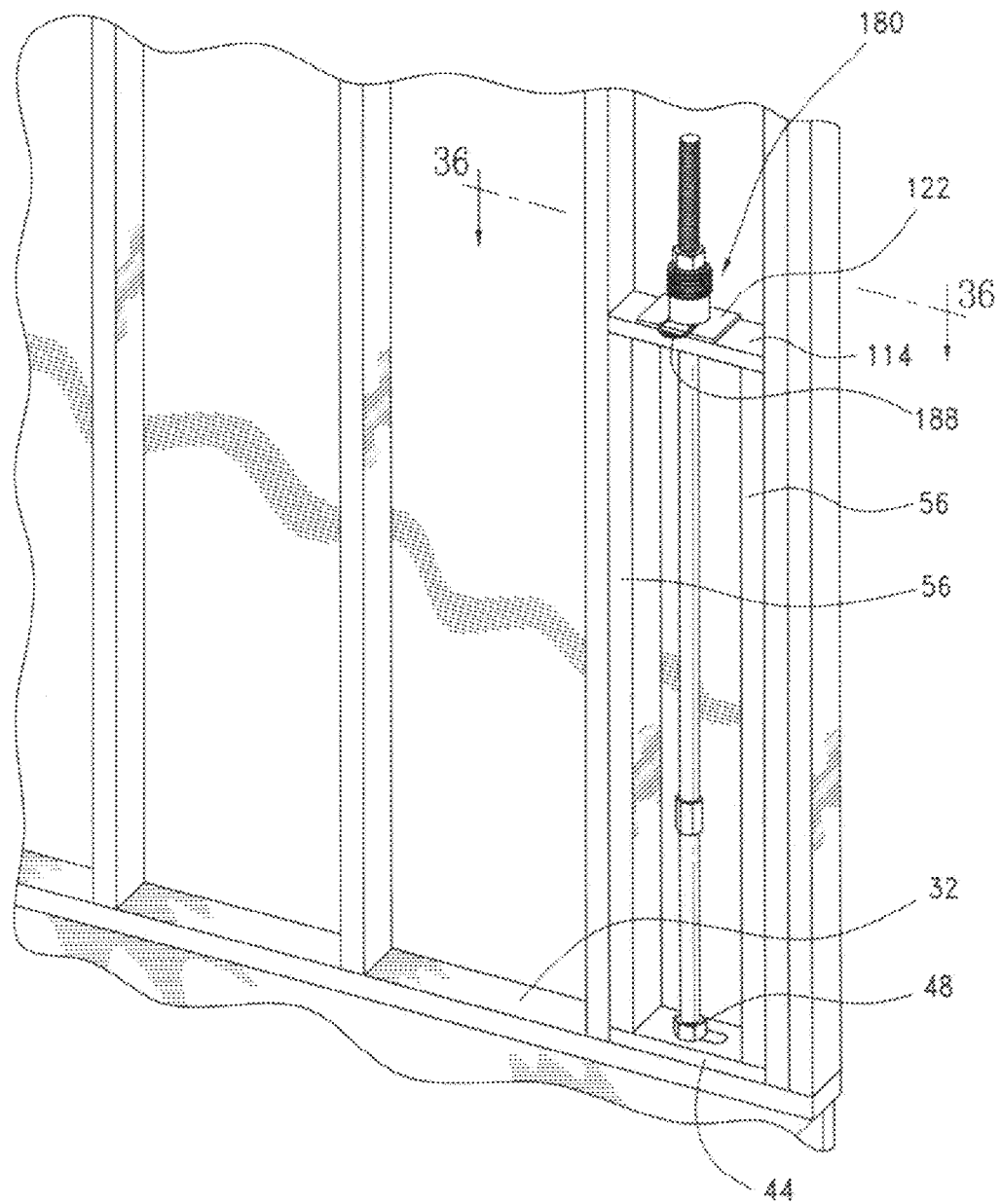
FIG. 32 is an enlarged view of a portion of FIG. 5.

FIG. 32 is an enlarged view of a portion of FIG. 5 at the second floor. Note the nut 48 securing the bridge member 44, used as baseplate compression plate, to the bottom plate and the tie-rod. Also note the bride member 114 bearing down on the end grain of the reinforcement studs 56 in a direction parallel to the grain of the wood.

Figure 37:
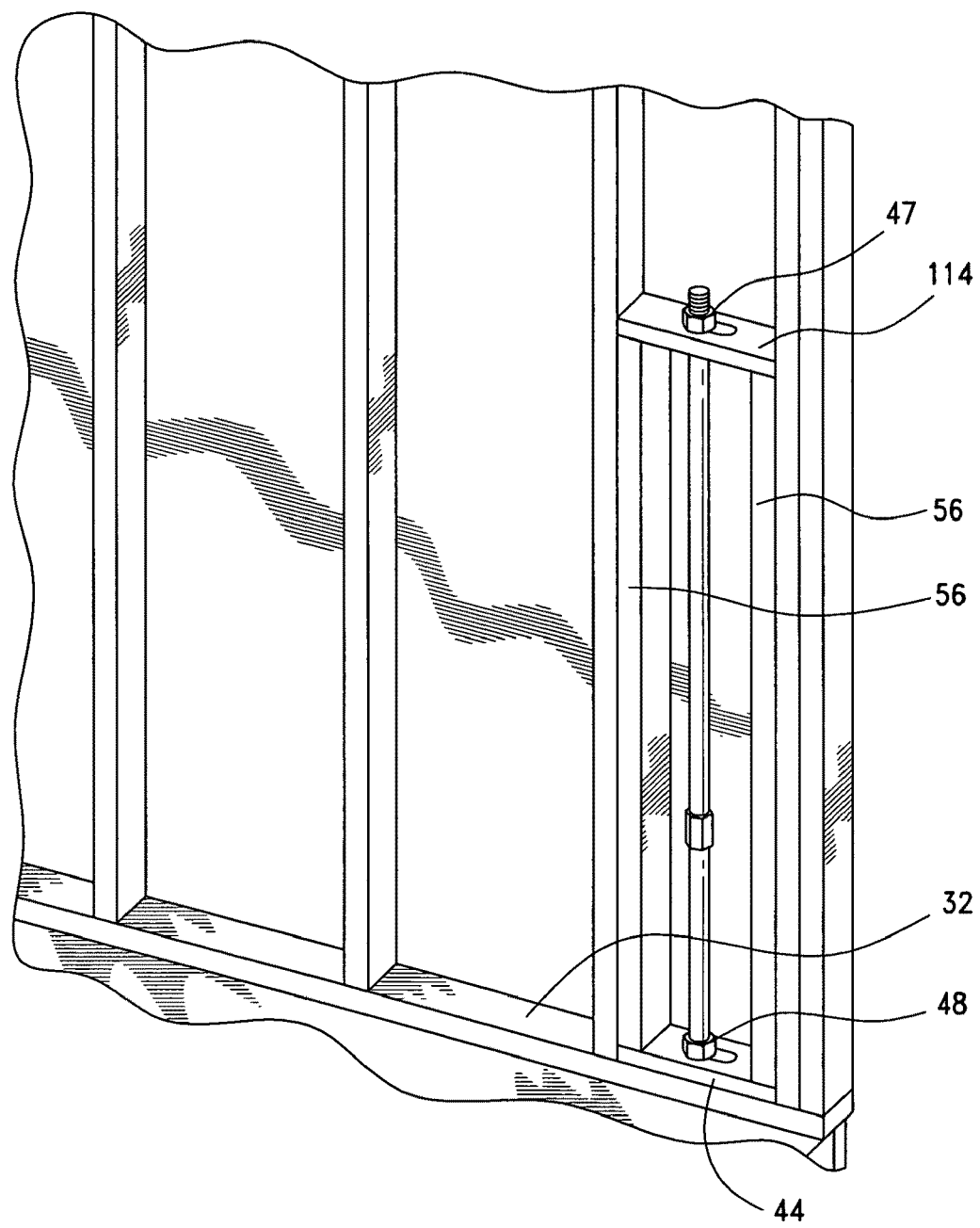
FIG. 37 is another embodiment of a hold down system made in accordance with the present invention, showing the use of metallic bridge members and nuts alone.

FIG. 37 is similar to FIG. 32, but showing the absence of the hold down device 180 and the bearing plate 122. Nut 47 secures the bridge member 114 to the top ends of the reinforcement studs 56, which are nailed to the adjacent studs. The washers 218 and 220 disclosed in FIG. 31 may also be used in conjunction with the nuts 47 and 48.

Figure 33:
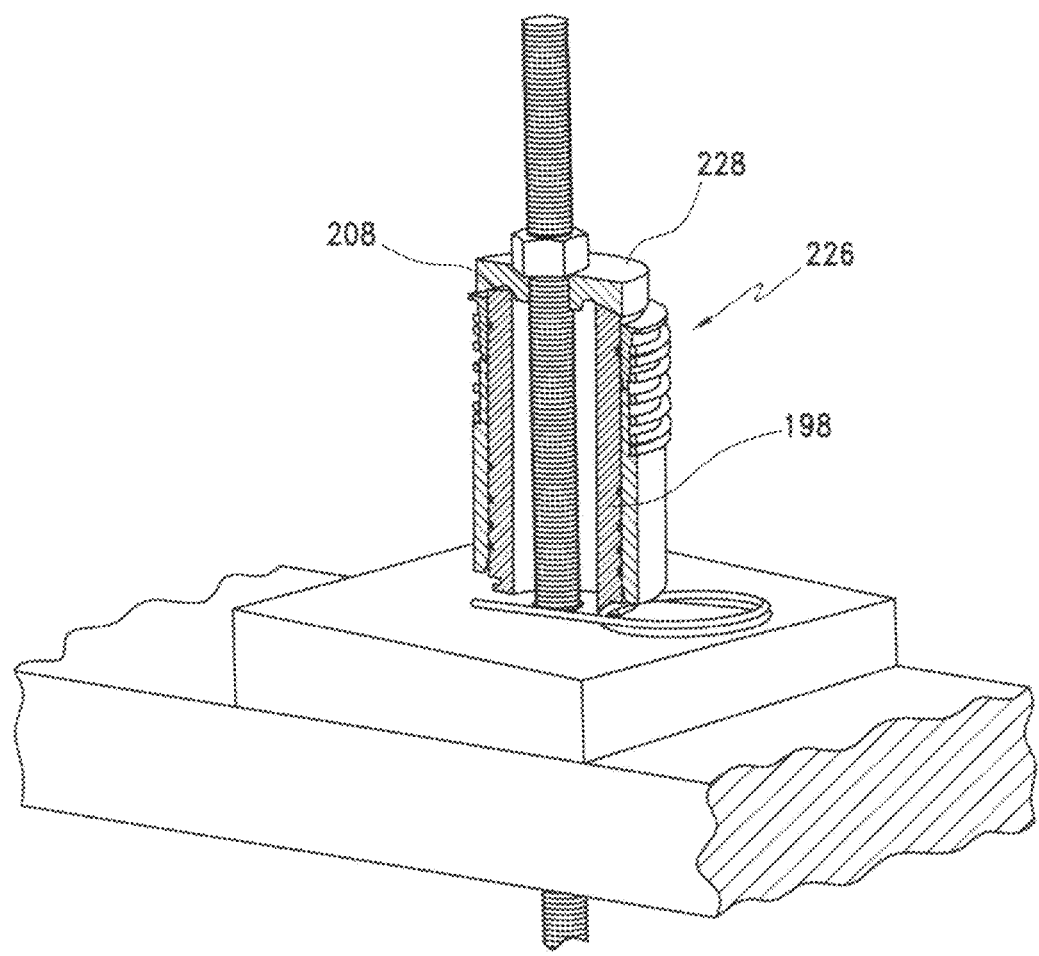
FIG. 33 is a perspective view, partly in cross-section, of another embodiment of a hold down device made in accordance with the present invention.
Figure 34:
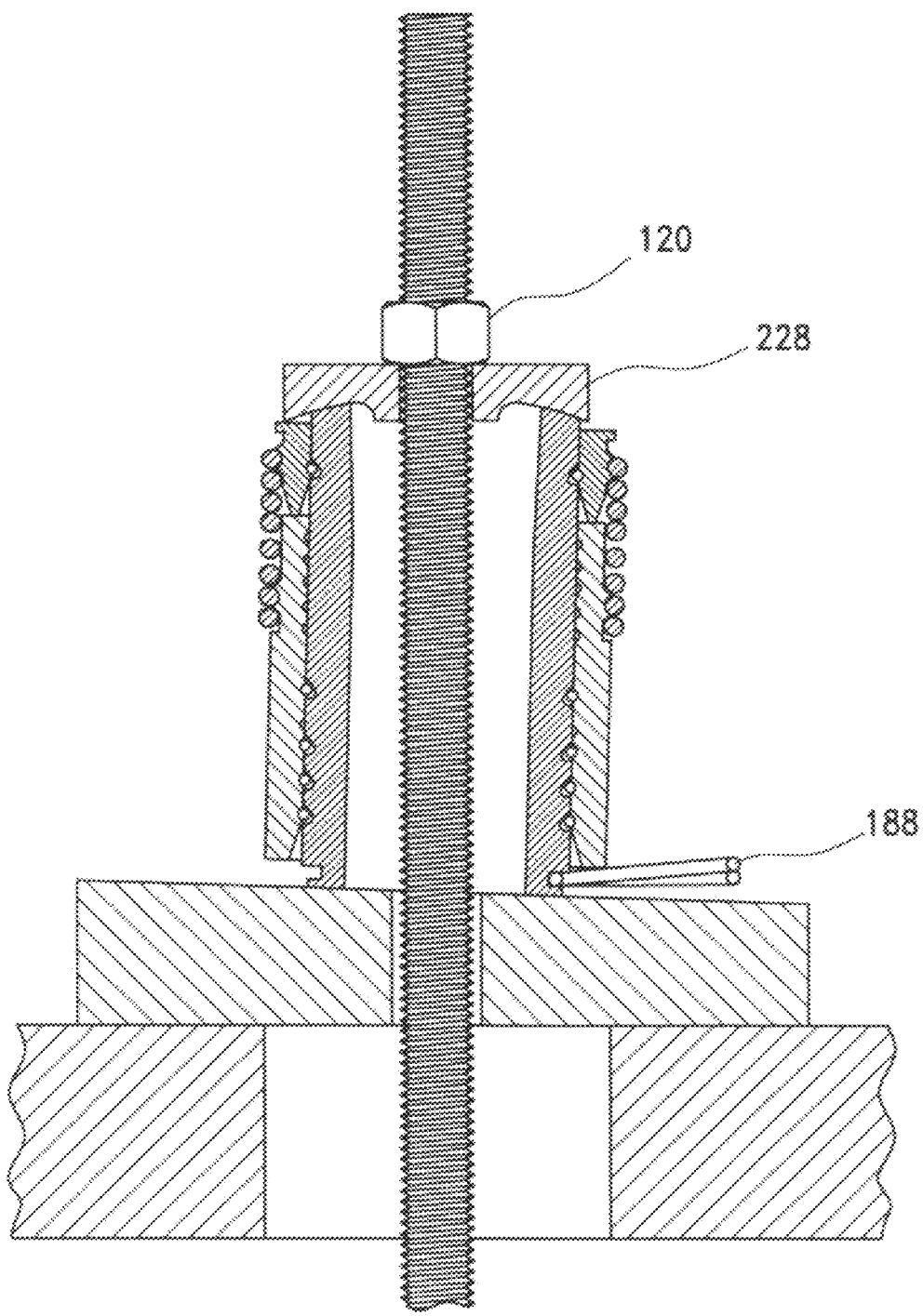
FIG. 34 is side elevation view of FIG. 33.
Figure 35:
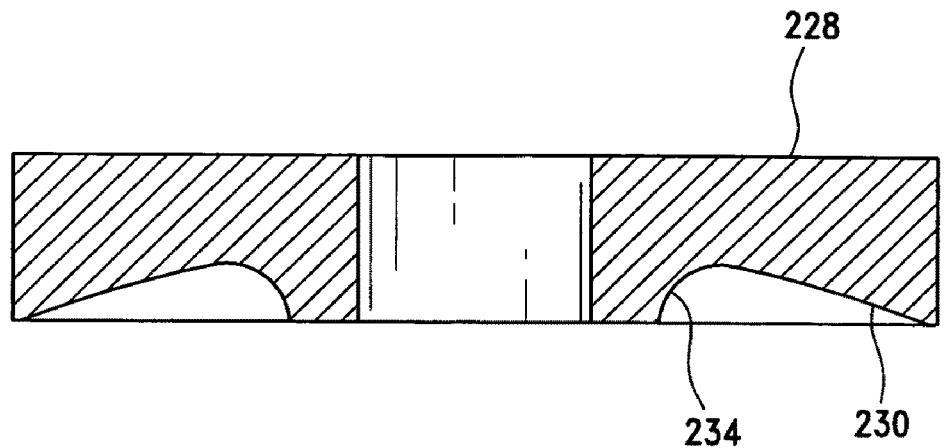
FIG. 35 is a cross-sectional view of a washer used in the embodiment of FIG. 33.

Another embodiment of a hold down device 226 is disclosed in FIGS. 33-35. The hold down device 226 is similar to the hold down device disclosed in FIG. 26, except that a different washer 228 is provided. The washer 228 has a circumferential concave surface 230 that mates with corresponding convex edge surface on the inner cylinder 198. The concave surface 230 terminates into a curved wall 234. The curved wall 234 provides a centering function and limits the lateral adjustment of the washer 228 relative to the hold down device 226, as shown in FIGS. 33 and 35.

It should be understood that the use of a bearing plate in conjunction with the metallic bridge member disclosed in the various embodiments is optional. The metallic bridge member may be used without the bearing plate.

The hold down device disclosed herein may also be used as a tensioning device when used as an expanding washer or expanding sleeve that takes up slack that may develop in a bolt, cable, tie rod, etc. used in any structure requiring maintenance of applied tension.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention.

I claim:

1. A building, comprising:
   a) a stud wall including a first bottom plate;
   b) a foundation;
   c) a tie rod operably anchored to said foundation and extending through said first bottom plate within said stud wall;
   d) a first bridge member attached to said stud wall, said first bridge member having an opening through which said tie rod extends;
   e) a first fastener assembly connecting said tie rod and said first bridge member to said stud wall, said fastener assembly including an axial opening through which said tie rod extends;
   f) said first fastener assembly including an inner body disposed within an outer body, a first nut securing said inner and outer bodies to said tie rod, a first spring urging one of said inner and outer bodies to move from a first position to a second position, and a removable restraining member in locking engagement with said inner and outer bodies to prevent said one of said inner and outer bodies from moving from said first position to said second position;
   g) said restraining member including a handle portion extending from said outer body, said handle portion being configured to be pulled by hand to remove said restraining member from said locking engagement; and
   h) said inner and outer bodies being movable relative to each other from said first position to said second position when said restraining member is removed, said one of said inner and outer bodies being fixed relative to said tie rod and said another of said inner and outer bodies being fixed relative to said first bridge member such that when said tie rod moves through said stud wall, said one of said inner and outer bodies moves with said tie rod from said first position to said second position.

2. A building as in claim 1, wherein:
   a) said first bridge member is made of metal; and
   b) said first bridge member opening is slotted.

3. A building as in claim 1, and further comprising:
   a) a bearing plate disposed between said first bridge member and said first fastener assembly;
   b) said first bearing plate including an opening through which said tie rod extends; and
   c) said bearing plate is ramped to compensate for vertical misalignment of said tie rod.

4. A building as in claim 3, wherein:
   a) said first bearing plate has a top surface; and
   b) said top surface is inclined from a horizontal plane at about 2°.

5. A building as in claim 1, and further comprising:
   a) a washer bearing on said one of said inner and outer bodies; and
   b) said nut bears on said washer.

6. A building as in claim 5, wherein:
   a) said one of said inner and outer bodies includes a curved upper edge; and
   b) said washer includes lower curved surface complementary to said curved upper edge.

7. A building as in claim 6, wherein said curved upper edge is concave and said lower curved surface is convex.

8. A building as in claim 6, wherein said curved upper edge is convex and said lower curved surface is concave.

9. A building as in claim 5, wherein said washer is color coded to indicate at least one of design load, hole size and amount of swivel provided.

10. A building as in claim 1, and further comprising:
    a) a bearing plate disposed between said first bridge member and said first fastener assembly;
    b) said first bearing plate including an opening through which said tie rod extends
    c) said another of said inner and outer bodies includes a lower curved edge; and
    d) a washer disposed between first fastener assembly and said first bearing plate, said washer including an upper curved surface complementary to said lower curved edge.

11. A building as in claim 10, wherein said lower curved edge is convex and said upper curved surface is concave.

12. A building as in claim 10 wherein said washer is integral with said first bearing plate.

13. A building as in claim 1, wherein:
    a) said nut includes a curved lower surface; and
    b) said one of said inner and outer bodies includes a curved upper edge complementary to said curved lower surface.

14. A building as in claim 1, wherein:

a) said one of said inner and outer bodies includes a curved upper edge; and
b) a self-centering washer bearing on said one of said inner and outer bodies, said self-centering washer including a lower curved surface complementary to curved upper edge.

15. A building as in claim 14, wherein said lower curved surface is concave.

16. A building as in claim 1, wherein said first bridge member bears on said first bottom plate.

17. A building as in claim 1, and further comprising:
a) second bridge member bearing on said first bottom plate, said second bridge member having an opening through which said tie rod extends, said second bridge member being disposed below and spaced apart from said first bridge member;
b) a pair of spaced apart reinforcement studs disposed between said first and second bridge members; and
c) said pair of spaced apart reinforcement studs includes bottom and top ends, said first bridge member bearing on said top ends, and said bottom ends bearing on said second bridge member.

18. A building as in claim 17, and further comprising a nut bearing on said second bridge member.

19. A building as in claim 17, and further comprising:
a) a second bottom plate;
b) a third bridge member bearing on said second bottom plate, said third bridge member being disposed below and spaced apart from said second bridge member, said third bridge member having an opening through which said tie rod extends;
c) a pair of spaced apart reinforcement studs disposed between said second and third bridge members; and
d) said pair of spaced apart reinforcement studs includes bottom ends bearing on said third bridge member.

20. A building as in claim 19, and further comprising a nut bearing on said third bridge member.

21. A building as in claim 1, and further comprising:
a) a second bridge member attached to said stud wall, said second bridge member having an opening through which said tie rod extends, said second bridge being disposed above and spaced from said first bridge member;
b) a second bearing plate disposed on top of said second bridge member, said second bearing plate including an opening through which said tie rod extends;
c) a second fastener assembly disposed above said first fastener assembly; and
d) said second fastener assembly including a second inner body disposed within a second outer body, a second nut securing said second inner and outer bodies to said tie rod, a second spring urging one of said second inner and outer bodies to move from a first position to a second position.

22. A building as in claim 21, wherein said second spring is configured to carry a load at least substantially equal to the weight of the length of said tie rod disposed between said first and second fastener assemblies.

23. A building as in claim 21, wherein said first bridge member bears on said first bottom plate.

24. A building as in claim 23, and further comprising:
a) a pair of spaced apart reinforcement studs disposed between said first and second bridge members; and
b) said pair of spaced apart reinforcement studs includes bottom and top ends, said second bridge member bearing on said top ends, and said bottom ends bearing on said first bridge member.

25. A building as in claim 1, and further comprising:
a) a pair of spaced apart reinforcement studs disposed between said first member and said first bottom plate; and
b) said pair of spaced apart reinforcement studs includes bottom and top ends, said first bridge member bearing on said top ends, and said bottom ends bearing on said first bottom plate.

26. A building as in claim 1, wherein said first spring is configured to carry a load at least substantially equal to the weight of the length of said tie rod disposed below said first fastener assembly.

27. A building as in claim 1, wherein said axial opening is larger than the diameter of said tie rod to allow said tie rod to be off vertical within said first fastener assembly.

28. A building as in claim 1, wherein said axial opening flares out at its top portion.

29. A building as in claim 1, wherein said first bridge member is color coded to indicate at least one of material type, capacity and dimensional size.

30. A building as in claim 1, wherein said first fastener assembly is color coded to indicate at least one of stroke length, useable load, and diameter of said axial opening.

31. A building as in claim 1, wherein:
a) said inner and outer bodies include first and second' opposing cylindrical walls, respectively;
b) said first opposing cylindrical wall includes a plurality of first receiving volumes;
c) said second opposing, cylindrical wall includes a plurality of second receiving volumes;
d) a resilient member disposed between said first and second opposing cylindrical walls, said resilient member is biased to occupy one of said first and second receiving volumes;
e) said first and second receiving volumes are configured in cross-section such that when said one of said inner and outer bodies is moved from said first locked position to said second locked position, said resilient member is shifted into and fully received within another one of said first and second volumes; and
f) said first and second volumes are configured in cross-section such that when said one of said inner and outer bodies is pushed from said second locked position to said first locked position, said resilient member is only partially received within said one of said first and second volumes, thereby precluding movement of said one of said inner and outer bodies.

32. A building as in claim 1, wherein said inner and outer bodies are movable along said axial opening.

33. A building, comprising:
a) a stud wall including a bottom plate;
b) a foundation;
c) a tie rod operably anchored in said foundation and extending through said bottom plate within said stud wall;
d) a bridge member attached to said stud wall, said bridge member having an opening through which said tie rod extends;
e) a fastener assembly connecting said tie rod and said bridge member to said stud wall, said fastener assembly including an axial opening through which said tie rod extends;
f) said fastener assembly including an inner body disposed within an outer body, a first nut securing said inner and outer bodies to said tie rod, a first spring urging one of said inner and outer bodies to move from a first position to a second position;

g) said one of said inner and outer bodies being fixed relative to said tie rod and said another of said inner and outer bodies being fixed relative to said bridge member such that when said tie rod moves through said stud wall, said one of said inner and outer bodies moves with said tie rod from said first position to said second position; and h) said first spring is configured to carry a load at least substantially equal to the weight of the length of said tie rod disposed between said fastener assembly and said foundation.

34. A building, comprising:
a) a stud wall including a first bottom plate;
b) a foundation;
c) a tie rod operably anchored in said foundation and extending through said first bottom plate within said stud wall;
d) a first bridge member attached to said stud wall, said first bridge member having an opening through which said tie rod extends;
e) a first fastener assembly connecting said tie rod and said first bridge member to said stud wall, said fastener assembly including an axial opening through which said tie rod extends;
f) said first fastener assembly including an inner body disposed within an outer body, a first nut securing said inner and outer bodies to said tie rod, a first spring urging one of said inner and outer bodies to move from a first position to a second position;
g) said one of said inner and outer bodies being fixed relative to said tie rod and said another of said inner and outer bodies being fixed relative to said first bearing plate such that when said tie rod moves through said stud wall, said one of said inner and outer bodies moves with said tie rod from said first position to said second position;
h) a second bridge member attached to said stud wall, said second bridge member having an opening through which said tie rod extends, said second bridge being disposed above and spaced from said first bridge member;
i) a second fastener assembly disposed above said first fastener assembly;
j) said second fastener assembly including a second inner body disposed within a second outer body, a second nut securing said second inner and outer bodies to said tie rod, a second spring urging one of said second inner and outer bodies to move from a first position to a second position; and
k) said second spring is configured to carry a load at least substantially equal to the weight of the length of said tie rod disposed between said first and second fastener assemblies.

35. A building, comprising:
a) a stud wall including a bottom plate and sheathing;
b) a foundation;
c) a tie rod operably anchored in said foundation and extending through said bottom plate within said stud wall;
d) a bridge member attached to said stud wall, said bridge member having an opening through which said tie rod extends;
e) a fastener assembly connecting said tie rod and said bridge member to said stud wall, said fastener assembly including an axial opening through which said tie rod extends;
f) said fastener assembly including an inner body disposed within an outer body, a first nut securing said inner and outer bodies to said tie rod, a spring urging one of said inner and outer bodies to move from a first position to a second position, and a removable restraining member locking said inner and outer bodies together to prevent said one of said inner and outer bodies from moving from said first position to said second position;
g) said restraining member including a handle portion extending beyond said outer body a distance greater than a distance between a rear surface of said outer body and said sheathing such that said handle portion is prevented from being disposed behind and between said outer body and said sheathing, thereby maintaining said handle portion in view of an installer; and
h) said inner and outer bodies being movable relative to each other from said first position to said second position when said restraining member is removed, said one of said inner and outer bodies being fixed relative to said tie rod and said another of said inner and outer bodies being fixed relative to said bridge member such that when said tie rod moves through said stud wall, said one of said inner and outer bodies moves with said tie rod from said first position to said second position.

36. A building as in claim 35, wherein said restraining member is removable by hand.

37. A building, comprising:
a) a stud wall including a first bottom plate;
b) a foundation;
c) a tie rod operably anchored in said foundation and extending through said first bottom plate within said stud wall;
d) a first metallic bridge member disposed on said first bottom plate, said first metallic bridge member having an opening through which said tie rod extends;
e) a first nut connecting said tie rod and said first bridge member to said first bottom plate;
f) a pair of spaced apart reinforcement studs; and
g) said pair of spaced apart reinforcement studs including bottom ends bearing on said first metallic bridge member;
h) a second metallic bridge member attached to said stud wall, said second bridge member having an opening through which said tie rod extends, said second bridge being disposed above and spaced from said first bridge member;
i) a second nut securing said second metallic bridge member to said stud wall;
j) a pair of spaced apart reinforcement studs disposed between said first and second bridge members; and
k) said pair of spaced apart reinforcement studs including bottom and top ends, said second bridge member bearing on said top ends, and said bottom ends bearing on said first bridge member.

38. A building as in claim 37, and further comprising:
a) a second bottom plate disposed above said first bottom plate;
b) a second metallic bridge member disposed on attached to said second bottom plate, said second bridge member having an opening through which said tie rod extends, said second bridge being disposed above and spaced from said first bridge member;
c) a second nut securing said second metallic bridge member to said second bottom plate;
d) a second pair of spaced apart reinforcement studs; and e) said second pair of spaced apart reinforcement studs including bottom bearing on said second metallic bridge member.

39. A building, comprising:
a) a stud wall including a bottom plate and a top plate;
b) a foundation;
c) a tie rod operably anchored in said foundation and extending through said bottom plate within said stud wall;
d) a pair of spaced apart reinforcement studs including upper ends;
e) a metallic bridge member bearing on top of said upper ends, said metallic bridge member having an opening through which said tie rod extends; and
f) a nut connecting said tie rod and bridge member to said reinforcement studs.

40. A building as in claim 39, and further comprising:
a) another pair of spaced apart reinforcement studs extending between said bridge member and said top plate; and
b) said another pair of reinforcement studs having bottom ends bearing on said bridge member.

* * * * *